US 6,234,717 B1

(12) United States Patent
Corbetta

(10) Patent No.: US 6,234,717 B1
(45) Date of Patent: May 22, 2001

(54) METHOD AND APPARATUS FOR CONNECTING UNDERWATER CONDUITS

(75) Inventor: Giovanni Corbetta, Aberdeen (GB)

(73) Assignee: Sonsub International Ltd. (GB)

( * ) Notice: Subject to any disclaimer, the term of this patent is extended or adjusted under 35 U.S.C. 154(b) by 0 days.

(21) Appl. No.: 09/376,070

(22) Filed: Aug. 17, 1999

Related U.S. Application Data

(63) Continuation of application No. 09/054,943, filed on Apr. 3, 1998.

(30) Foreign Application Priority Data

Apr. 3, 1997 (GB) .................................................. 9706762

(51) Int. Cl.[7] .................................................. F16L 1/00
(52) U.S. Cl. ......................... 405/170; 405/158; 405/169
(58) Field of Search ................................... 405/170, 171, 405/169, 158, 159, 160, 161, 162

(56) References Cited

U.S. PATENT DOCUMENTS

| 3,166,123 | * | 1/1965 | Watkins | 405/191 X |
| 4,030,309 | * | 6/1977 | Mason | 405/190 |
| 4,203,687 | * | 5/1980 | Sumner | 405/170 |
| 4,234,268 | * | 11/1980 | Scodino | 405/173 X |
| 4,515,101 | * | 5/1985 | Stevens et al. | 405/169 |
| 4,832,530 | * | 5/1989 | Andersen et al. | 405/169 X |
| 5,458,439 | * | 10/1995 | Hall et al. | 405/169 X |
| 5,593,249 | * | 1/1997 | Cox et al. | 405/170 X |

FOREIGN PATENT DOCUMENTS

2040012 * 8/1980 (GB) ..................................... 405/170

* cited by examiner

Primary Examiner—Eileen D Lillis
Assistant Examiner—Frederick L. Lagman
(74) Attorney, Agent, or Firm—Lalos & Keegan

(57) ABSTRACT

A method and apparatus for connecting underwater conduits and more specifically, to a method and apparatus which is capable of performing the diverless connection of underwater flowlines and connection of these flowlines to underwater structures such as flowline bases, xmas trees and templates. The connection of underwater conduits facilitated by the use of a remotely operated vehicle and connection apparatus both being launchable and recoverable by a support vessel. The connection apparatus adapted to mount on at least one of the underwater conduits and the connection apparatus allowing for docking of the remotely controlled vehicle which then captures and draws a second conduit to form a continuous flowline.

19 Claims, 36 Drawing Sheets

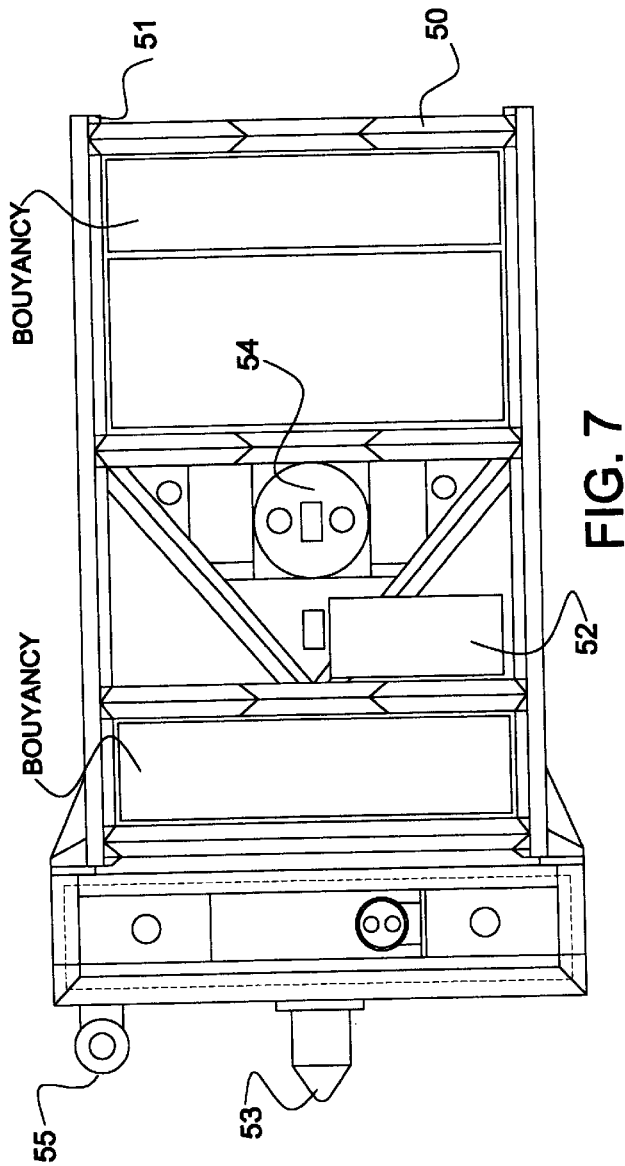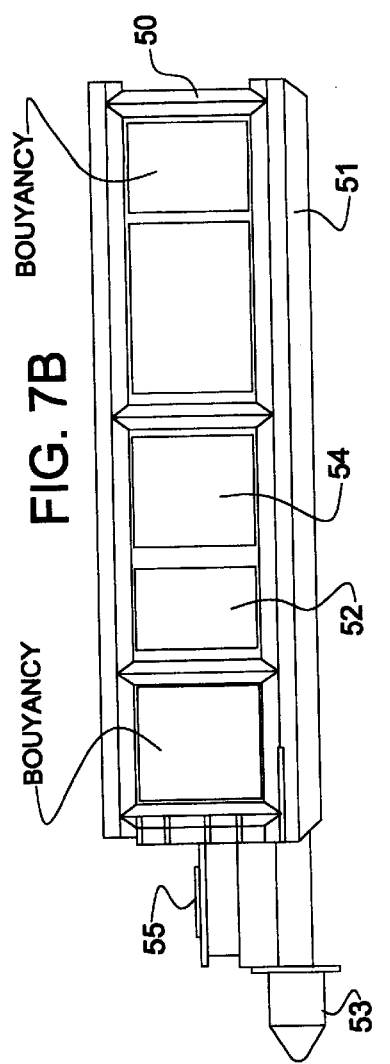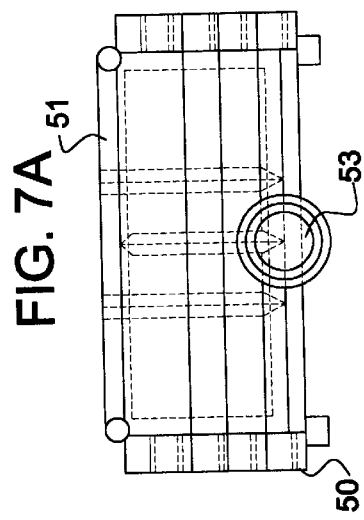

METHOD AND APPARATUS FOR CONNECTING UNDERWATER CONDUITS

This application is a continuation of application Ser. No. 09/054,943 filed Apr. 3, 1998.

1. INTRODUCTION

This invention relates to a method and apparatus for connecting underwater conduits and, more specifically, to a method and apparatus which is capable of performing the diverless connection of underwater flowlines—both flexible and rigid—in any combination of each other, and connection of the said flowlines to underwater structures such as flowline bases, xmas trees, templates or similar.

There are various recognised methods of diverless connection of underwater flowlines to underwater structures. The methods used for such connections are characterised mainly by two principal factors; the use of permanently installed underwater hardware known as a tie-in porch or reaction structures and the strict dependency upon the related connection system (connector). Both the permanently installed underwater hardware and connection system are critical parameters. The items of hardware required to support the connection operations are usually installed during flowline or underwater structure installation, any deviation from standard procedures required by the installers could result in a very high cost impact making the system less competitive than other alternative options Furthermore, the strict dependence upon a given connection system can limit the use of the system to certain applications.

The above reasons highlight the need for an alternative method which is able to overcome both the needs of permanently installed underwater hardware and the dependence upon a given connection system whilst ensuring the same operating reliability as existing systems. In addition, the selection of an intervention philosophy requiring the use of neutrally buoyant tools optimises the flexibility of the presented method thus avoiding any dependency on the surface support vessel.

The aim of the present invention is to negate these drawbacks by providing a system which allows fully remote connection of underwater flowlines without using any permanently installed underwater hardware, allowing the use of any type of connection system, and performing all the operations using only the remotely operated vehicle to install and operate all the system's tools.

According to one aspect of the present invention there is provided a method of connecting underwater conduits from a support vessel on the surface comprising the steps of launching a remotely operated vehicle from the support vessel, launching connection apparatus from the support vessel; manipulating the remotely operated vehicle to dock with the connecting apparatus; installing the connection apparatus to one of the conduits; activating a docking clamp means using the remotely operated vehicle to capture the end of the first conduit; activating the connection apparatus to draw the second conduit to the first; connecting the two conduits together to form a continuous flowline; providing a sealed connection, and recovering the remotely operated vehicle and connection apparatus to the support vessel.

Each of the above method steps are carried out without the need for underwater personnel. Each step is monitored and controlled from the support vessel thereby increasing the efficiency and safety of the connection process.

Additionally, the method includes the step of supporting the conduit on a frame above the sea bed.

Advantageously, the remotely operated vehicle carries out a survey of the work site and sends a report to the support vessel prior to connection of the conduits According to the further aspect of the present invention there is provided an apparatus for connecting underwater conduits being controlled from a support vessel on the surface, the apparatus comprising a remotely controlled vehicle launchable and recoverable from the support vessel; connection apparatus launchable and recoverable from the support vessel; means for docking the remotely operated vehicle to the connection apparatus; means for mounting the connection apparatus on one or both of the conduits; means provided for capturing the end of the other conduit and drawing the second conduit to the first to enable a connection of the conduits to form a continuous flow line; means to effect the connection and means for providing a sealed joint.

Advantageously, each of the connection apparatus is launched in a sledge from the support vessel.

Preferably, a support frame is also launched from the support vessel, the support frame being placed around one or both (depending on the field layout) of the conduits by the remotely operated vehicle to raise the conduit from the sea bed.

Advantageously, the frame is a light-weight metallic frame substantially H-shape in configuration.

Preferably an interface skid is provided which is connected to the remotely controlled vehicle, launchable and recoverable from the support vessel, which allows the remotely controlled vehicle to dock mechanically, hydraulically and electrically to the connecting apparatus in order to provide power for the connecting apparatus.

Conveniently, an interface collar is provided on the free end of the flexible conduits to allow the connection apparatus to be mounted in position on the flexible conduits.

Advantageously, buoyancy modules are provided in addition to the support frame. These modules act along with the support frame thereby raising the conduit from the seabed to enable connection of the adjacent conduit to be carried out.

Conveniently, the support frame and the connection apparatus are substantially buoyant in water to enable manoeuvrability by means of the remotely operated vehicle.

Advantageously, the manipulation means on the remotely operated vehicle is an articulated arm having a closeable grab arrangement at the free end thereof.

2. EQUIPMENT DESCRIPTION

Embodiments of the present invention will now be described with reference to and as shown in the accompanying drawings in which:

FIG. 7 is a plan view of an "interface skid" to provide the interface between the remotely operated vehicle and the connection apparatus.

FIG. 7A is an end view of FIG. 7.

FIG. 7B is a side elevational view of FIG. 7.

Figure 13:
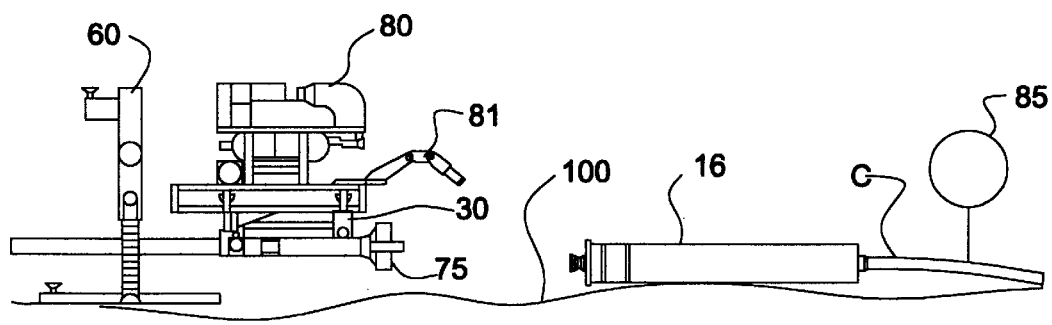
FIG. 13 is a schematic view of a further stage of the operation.
Figure 13A:
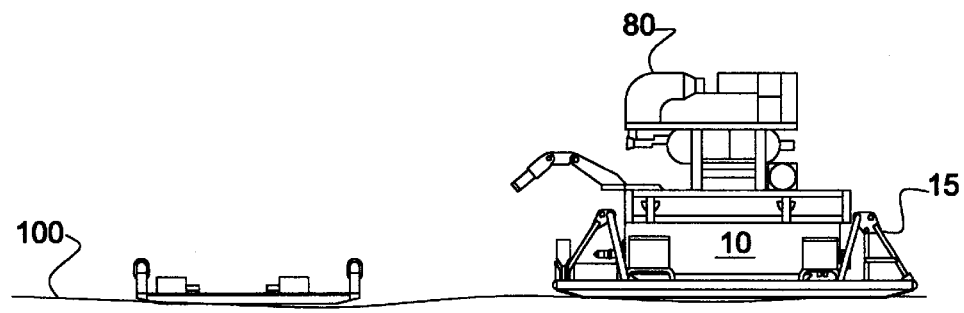
Figure 13B:
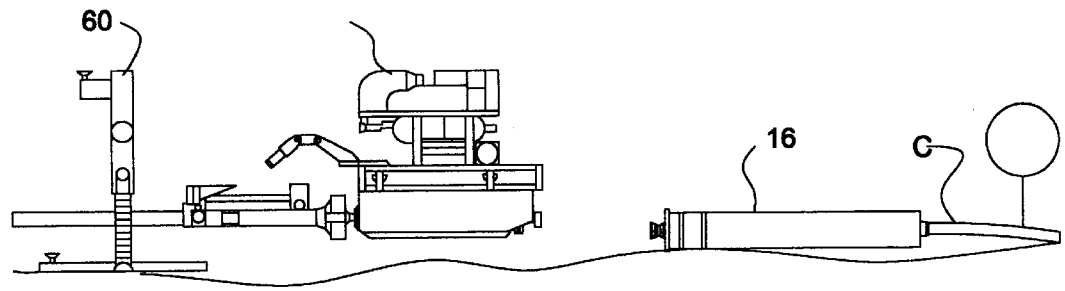
Figure 13C:
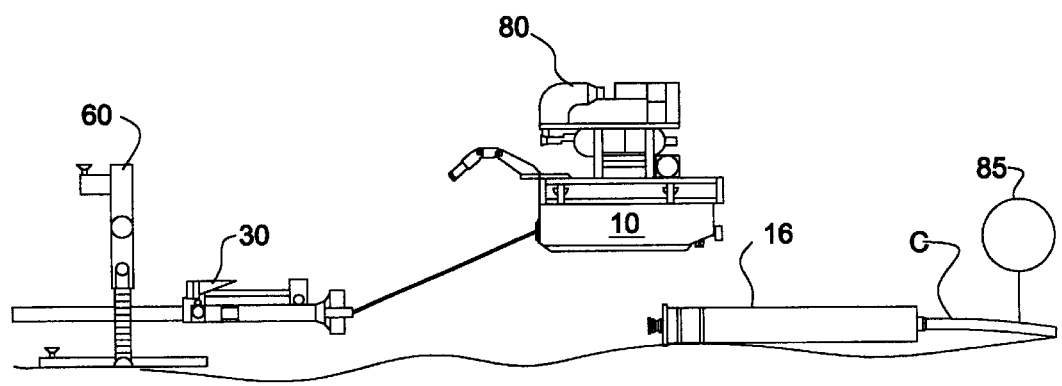

FIG. 13A, B, and C are schematic view of a still further steps in the operation.

FIGS. 14, 14A, 14B and 14C are schematic views of further steps in the operation.

Figure 15:
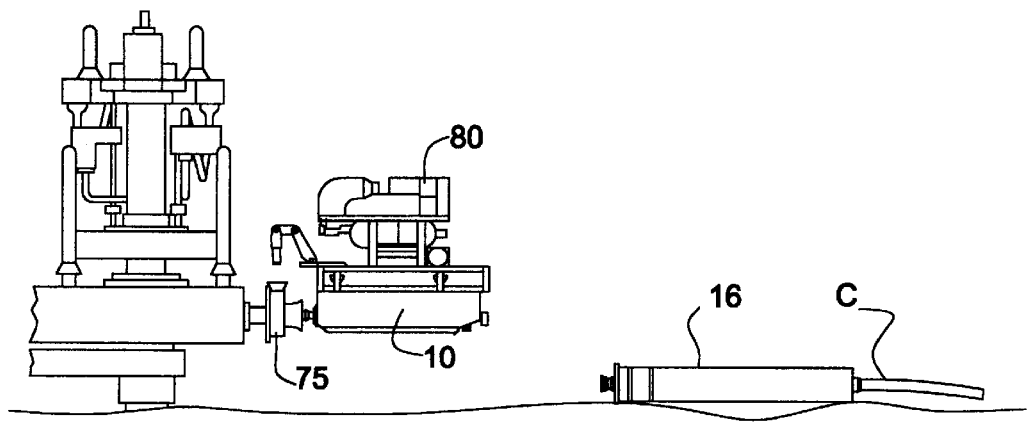
Figure 15A:
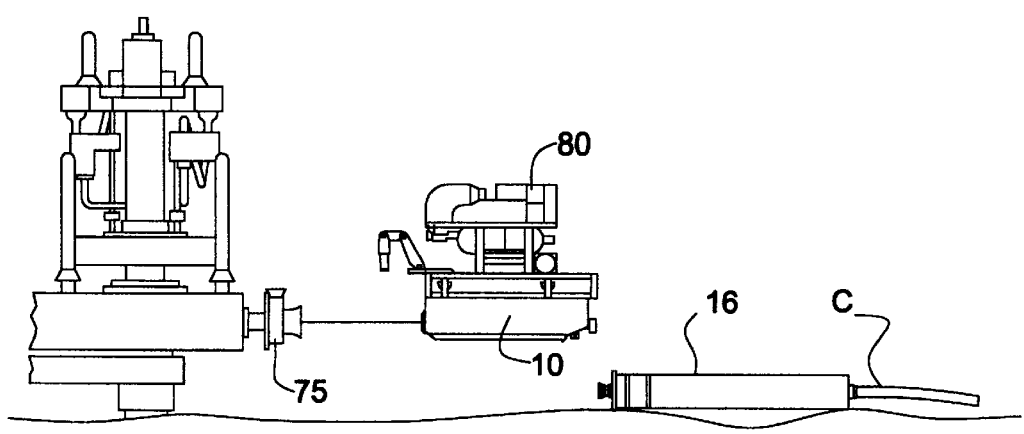

FIGS. 15 and 15A are schematic views of further steps in the operation in connecting a flexible conduit to a subsea structure.

Figure 16:
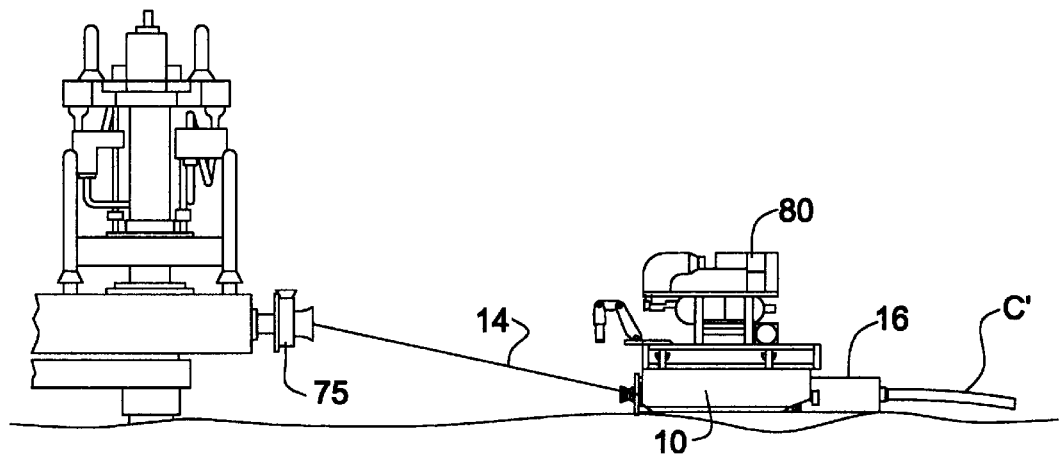
Figure 16A:
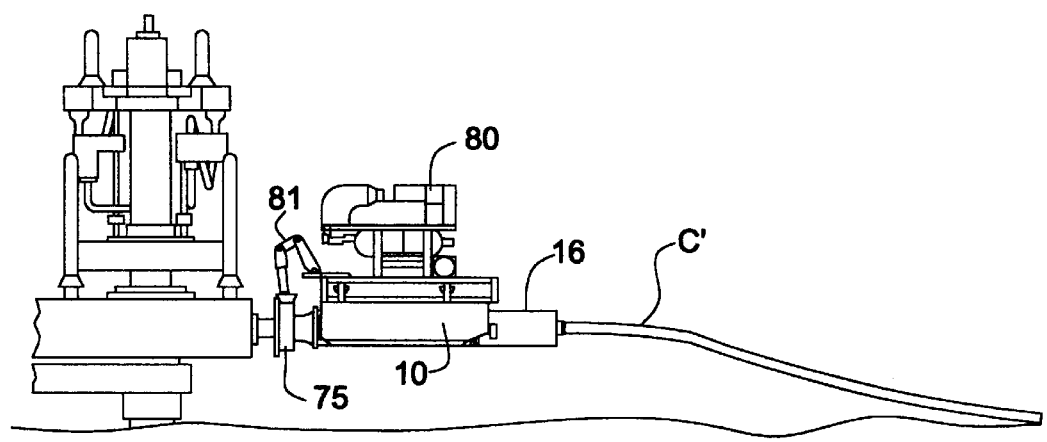

FIGS. 16 and 16A are schematic illustrations of further stages in the operation in connecting a flexible conduit to a subsea structure.

FIGS. 17, 17A, 17B and 17C are schematic views of successive steps in connecting a rigid conduit to another rigid conduit.

FIGS. 18, 18A, 18B and 18C are schematic views of later stages in connecting a rigid conduit to another rigid conduit.

FIGS. 19, 19A, 19B and 19C are schematic views of further successive steps in connecting a rigid conduit to another rigid conduit.

FIGS. 20, 20A, 20B and 20C are schematic views of successive steps in connecting a rigid conduit to another rigid conduit.

FIGS. 21, 21A, 21B and 21C are schematic views of successive steps in connecting a rigid conduit to another rigid conduit.

FIGS. 22, 22A, 22B and 22C are schematic views showing a more detailed operation sequence of the connection apparatus.

FIGS. 23, 23A, 23B and 23C are schematic views showing a further detailed operational sequence of the connection apparatus.

FIGS. 24, 24A, 24B and 24C are schematic views showing a more detailed operational sequence of the connection apparatus.

Figure 25:
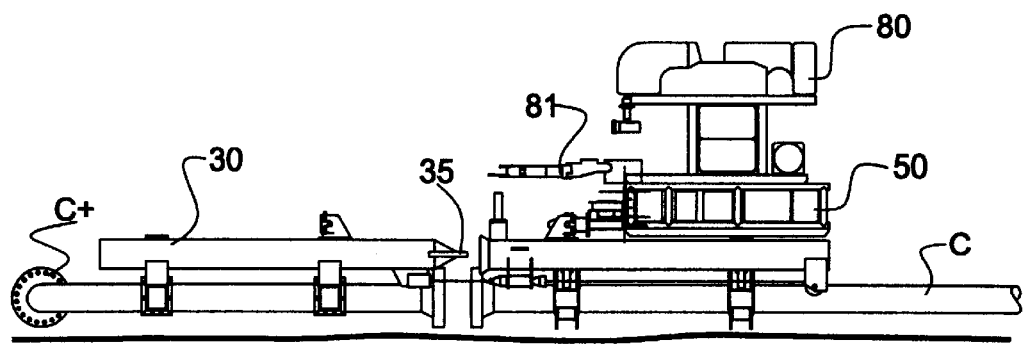
Figure 25A:
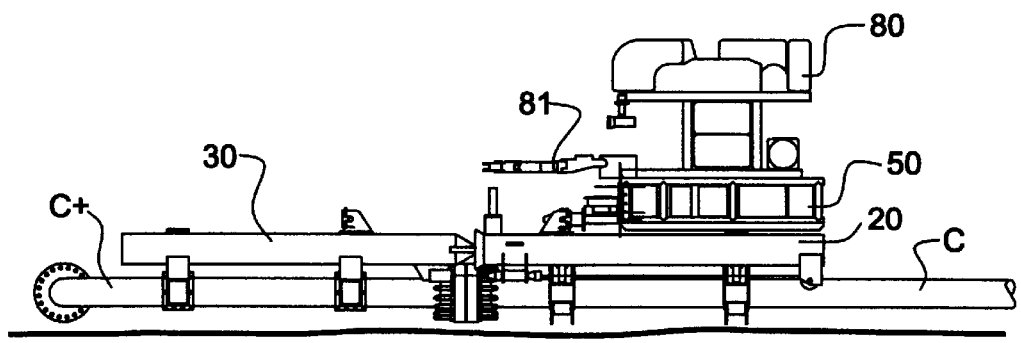
Figure 25B:
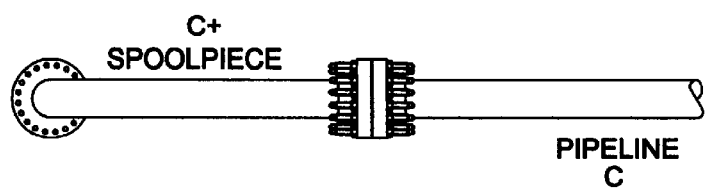

FIGS. 25, 25A and 25B are schematic views showing further detailed operational sequences of the connection apparatus.

The apparatus for connecting the conduits together comprises a complete set of tools and equipment able to perform, but not limited to, connections of rigid conduits to flexible conduits and rigid conduits to rigid spool pieces.

The said tools include a diverless flexible conduit connection system 10 (FIG. 1) (hereinafter referred to as a DFCS), an axial force tool (AFT) 20 (FIG. 4), a reaction tool (RT) 30 (FIG. 5), a reaction yoke tool (RYT) 31 (FIG. 5a). flange connection tools (FCT) 41 (FIG. 6) and 46 (FIG. 6a), an interface skid (SKID) 50 (FIG. 7), and equipment used to support offshore operations including a lightweight H-frame (LHF) 60 (FIG. 8) each of which will be described in greater detail below.

2.1 DIVERLESS FLEXIBLE CONNECTION SYSTEM

Figure 1:
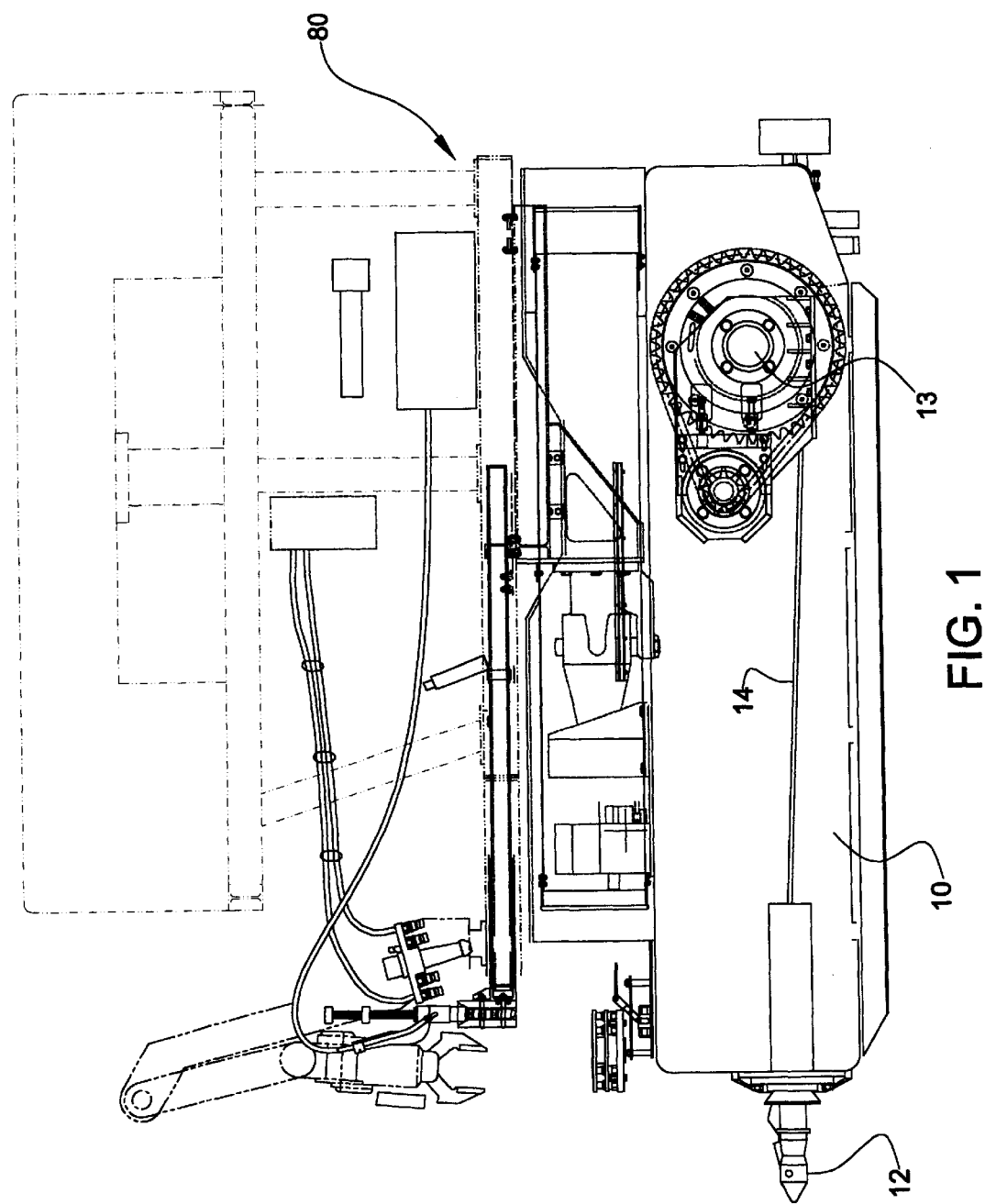
FIG. 1 is a side view of the "diverless flow line connection system" part of the connection apparatus, fixed to the underside of the remotely operated vehicle; one aspect of the present invention.
Figure 2:
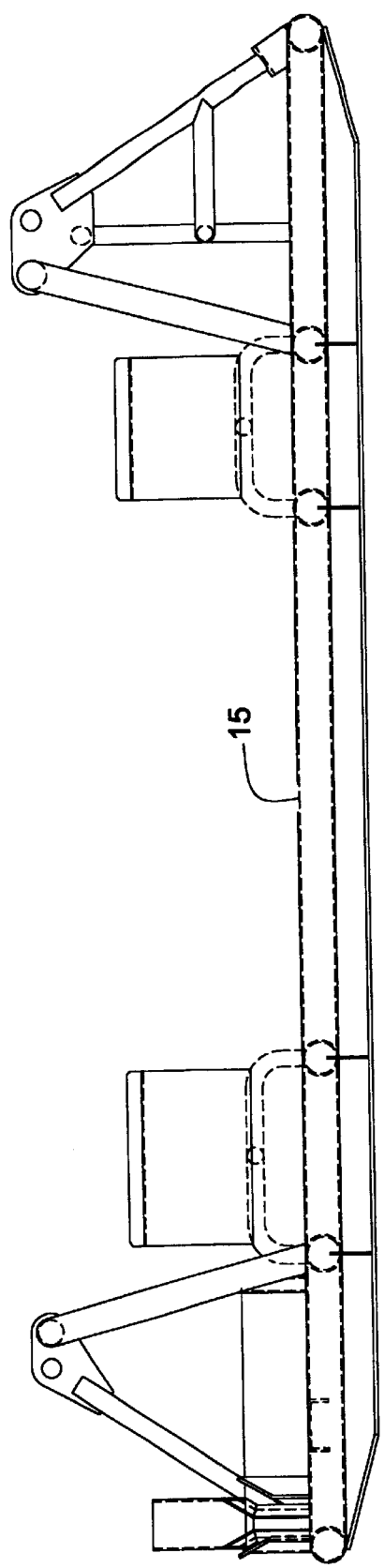
FIG. 2 is a side elevational view of a "deployment frame" for launching and recovering the connection means from a support vessel on the surface.
Figure 3:
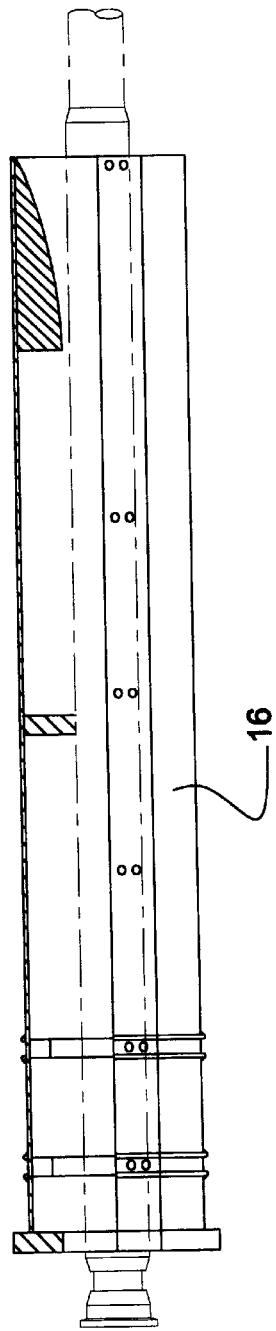
FIG. 3 is a side elevational view partly in phantom and partly in cross section of an "interface collar" connected to a flexible pipeline.

The said DFCS 10 which is shown in detail in FIG. 1 (for more information refer to: Australian patent No 658239, U.S. Pat. No. 5,593,249, Norwegian Patent No; 96, 1761 and United Kingdom Patent No; GB2300439) consists of a structural skid frame with winches 13 (FIG. 1), stab-in anchors 12 (FIG. 1) and conduit clamp arms (not shown). The DFCS is deployed to the sea bed on a deployment frame 15 (FIG. 2) which can be raised or lowered from a support vessel (not shown) moored above the conduits C to be joined.

2.2 AXIAL FORCE TOOL

Figure 4:
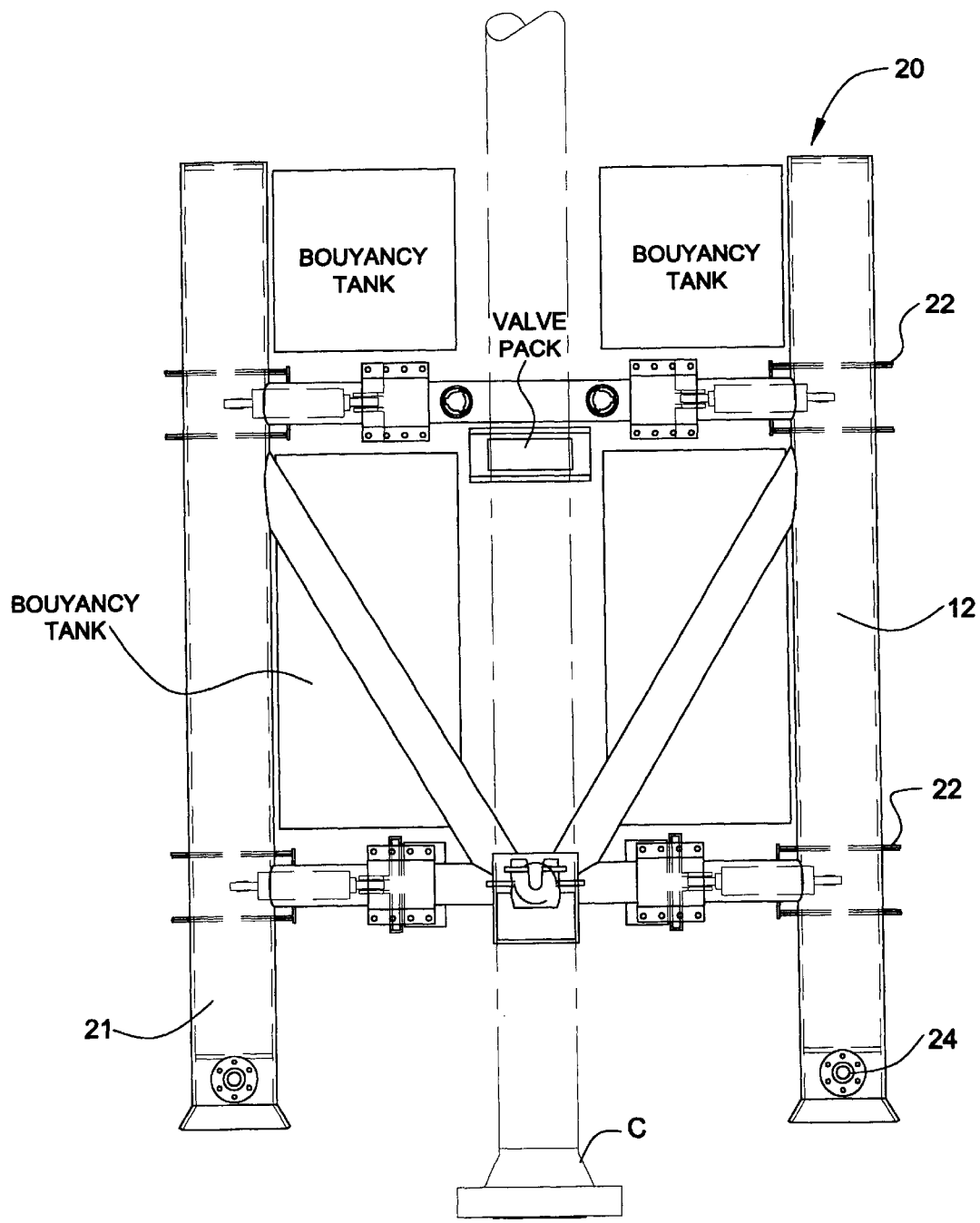
FIG. 4 is a plan view of an "axial force tool" part of the connection apparatus.
Figure 4A:
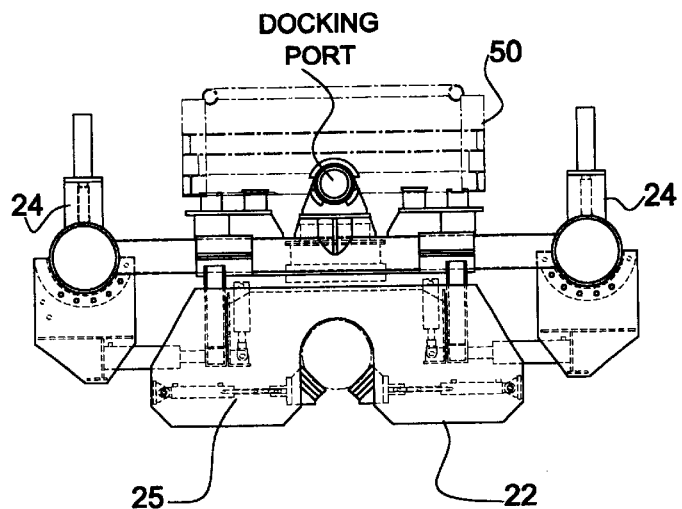
FIG. 4A is an end elevational view of the "axial force tool" of FIG. 4.
Figure 4B:
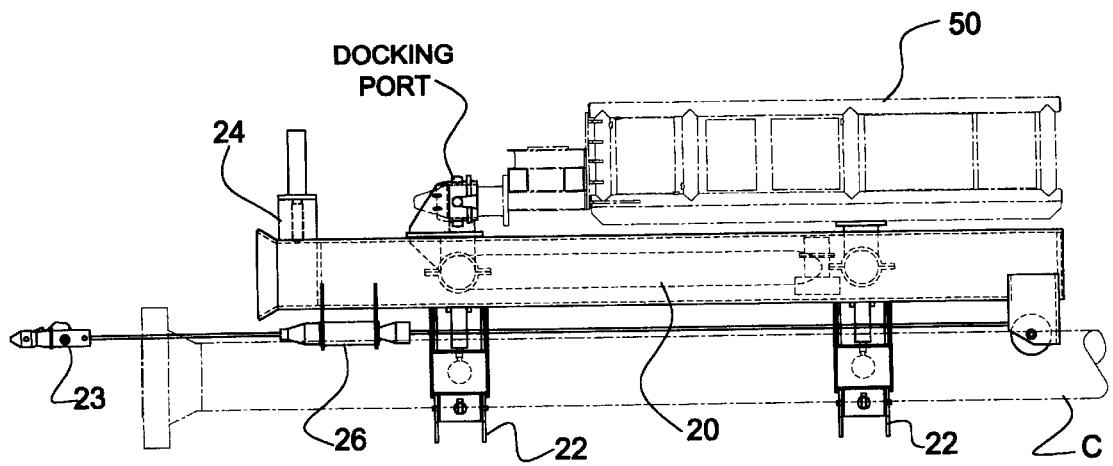
FIG. 4B is a side elevational view partly in phantom of the "axial force tool" of FIG. 4.

The Axial Force Tool (AFT) 20, shown in detail in FIG. 4, is primarily a steel structure designed to perform close proximity tie-ins. It is used in conjunction with the Reaction Tool (RT) 30 (FIG. 5) arid other items of the connection equipment to perform pull-in operations and flange alignment. The AFT can also be used for flexible line pull-in using a flange puller system with the possibility to increase, on demand, the available length of pulling wire.

The AFT comprises of a steel structure 21 (FIG. 4) manufactured either from commercially available standard or high strength steel. The structure includes two main lateral members, and a combination of smaller members to stiffen the structure In one configuration all members are tubular, some of which can be flooded and others which can be kept free of water to give additional buoyancy when submerged to reduce in water weight Mounted onto the structure are two hydraulically operated clamp modules 22 (FIG. 4), front and rear The clamp modules 22 serve two functions; they allow the AFT to be installed onto the conduit securely by means of clamp cylinders 25, and they allow the conduit to be deflected relative to the AFT structure.

The front and rear clamp modules 22 are manufactured to suit a range of conduit size. Each clamp module will comprise of four cylinders 25 (FIG. 4) fitted to each of the front and rear clamp modules. Clamping onto the conduit is via parallel control of the front and rear clamp cylinders 25.

The use of a hydraulic accumulator (not shown) could also allow the ROV to leave the AFT to install the docking anchors 23 (FIG. 4) in the RT receptacles 34 (FIG. 5) should a second ROV be unavailable. In an emergency, the pipe clamps cylinders are released and allow the AFT to be recovered.

Also mounted onto the main structure is a wire rope type flange pulling system 23 & 26 (FIG. 4), referred to as the pull-in system This comprises of two flange pulling cylinders 26 (FIG. 4), one each fitted to the port and starboard sides at the front of the AFT frame. The pull-in system 23, 26 is used to provide the capability of the connection system to draw the flanges of the conduit together. Alternatively, the pull-in system could be replaced by standard subsea winches or hydraulic cylinders.

The pull-in system 23, 26 will employ existing commercially available flange pulling technology, but adapted to suit the specific needs of ROV operation. Each flange pulling cylinder 26 (FIG. 4) is essentially a linear winch which pulls in a length of rope on each stroke.

The main AFT structure is also fitted with a frame engagement system 24 (FIG. 4) which permits the AFT to engage and lock to the RT structure, so forming a single structure used for the conduit deflection Operation.

Contained within the AFT is a hydraulic system that provides the means of power to the pull-in system, clamp modules, frame engagement system 24 and clamp module deflection. Hydraulic supply for the AFT will be provided by the Interface Skid 50 (FIG. 7) which is carried under the host ROV. The AFT will be fitted with two interconnected hydraulic systems: one medium pressure, and one high pressure. The medium pressure system will be used but not limited to control pipe clamps, clamp module vertical motion and frame engagement and lock functions. The high pressure system will be used but not limited to provide control of clamp module 22 horizontal motion (pipe/spoolpiece deflection) and control of the pull-in system (pipe/spoolpiece pull-in) 23, 26.

The AFT is to contain many "failsafe" features which allow recovery of equipment with minimal damage if a failure (hydraulic or mechanical) occur during operations The loads being transmitted to the conduit are also to be monitored to ensure no damage occurs.

2.3 REACTION TOOL AND REACTION YOKE

The Reaction Tool (RT) 30 (FIG. 5) and Reaction Tool Yoke (RTY) 31 (FIG. 5a), are primarily steel structures designed to assist tie-in operations by reacting all forces applied by the Axial Force Tool (AFT) 20 (FIG. 4). They are used in conjunction with the AFT and other items of the equipment spread to perform pull-in operations and flange alignment.

The RTY is used instead of the RT on conduits where installation space to allow connection is limited (i.e. 1st end tie-in to a subsea structure). In certain applications. the possibility of having a limited space behind the connection point is possible (this applies, for example, in case of a riser with a gooseneck termination, a manifold flange. etc.). In these instances the alignment loads are reduced.

The RT comprises of a steel structure 32 (FIG. 5) manufactured from either commercially available standard or high strength steel. The same philosophy as for the AFT has been adopted Mounted onto the structure are two hydraulically operated clamp modules 33 (FIG. 5), front and rear The clamp modules 33 allow the RT to be installed the conduit securely by means of clamp cylinders 36 (FIG. 5) The clamp cylinders 36 are included in a structural frame 32 (FIG. 5) designed to pass all loads due to deflection of the spoolpiece or flowline (axial force, lateral component and torsion) back into the conduit. This is achieved by the use of high force clamp cylinders 36 which "grip" the tool to the conduit—the structural frame 32 being used to avoid loads other than push/pull acting on the clamp cylinders.

In a similar manner to the AFT, the RT is provided with a means of accommodating different conduit sizes by the fitting of different size clamp modules 33.

Mounted onto the front of the RT structure 32 (FIG. 5) are receptacles 34 (FIG. 5) for anchoring the wire ropes of the AFT pull-in system 23, 26.

The RT structure 32 is also fitted with a frame engagement system 35 (FIG. 5) which permits the RT structure to engage with the AFT structure 28, so forming a single entity used for deflection of the conduit.

Contained within the RT is a hydraulic system which provides the means of power to the front and rear clamp modules. The RT will be fitted with a dual port female stab (not shown) to provide control of hydraulic services Hydraulic supply for the RT will be provided by the interface skid 50 (FIG. 7), which is carried the host ROV. The RT will be fitted a hydraulic system. The hydraulic system will be used but not limited to clamp the clamp modules 33 onto the conduit and provide the clamping force necessary during deflection of the conduit.

Figure 5:
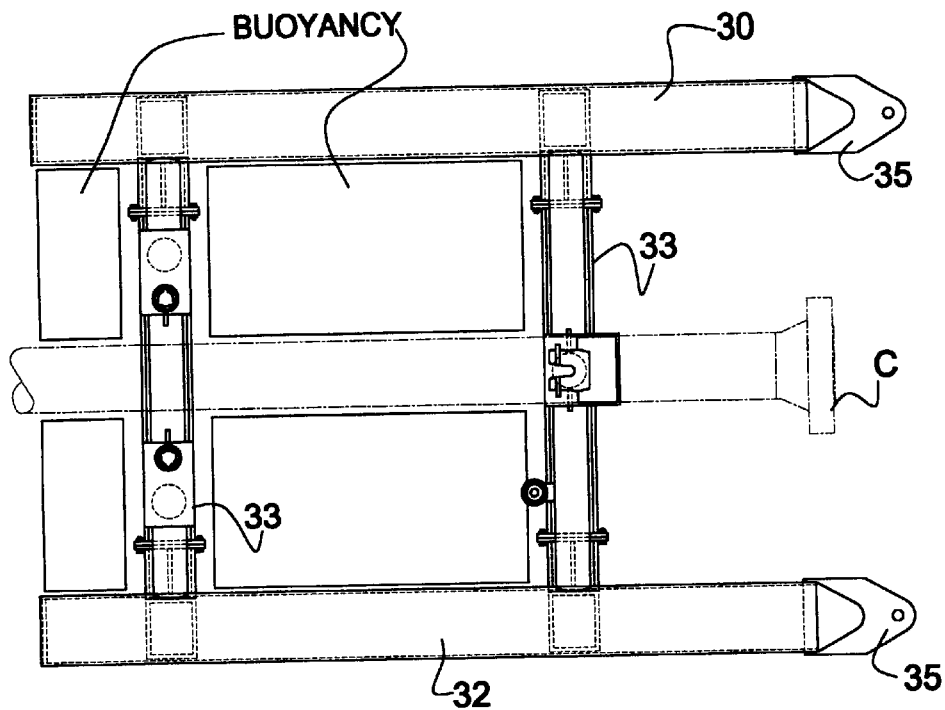
FIG. 5 is a plan view partly in phantom and partly broken away of the "reaction tool" part of the connection apparatus.
Figure 5A:
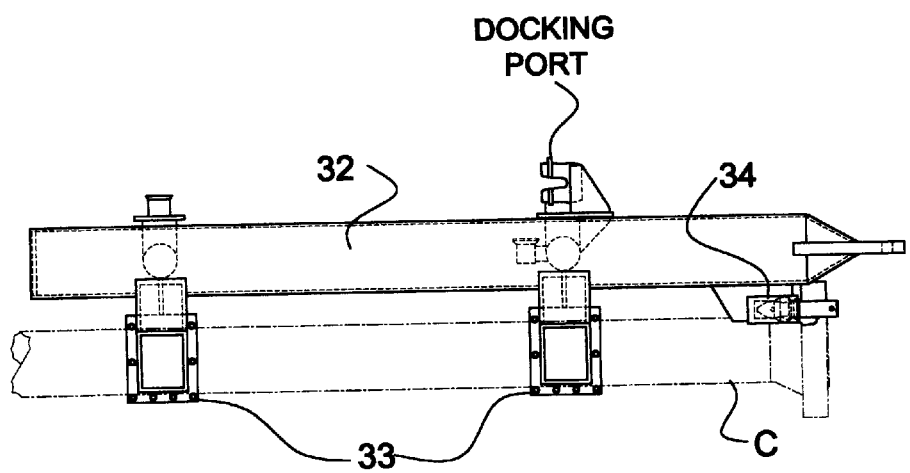
FIG. 5A is a side elevational view partly in phantom and partly broken away of the "reaction tool" of FIG. 5.
Figure 5B:
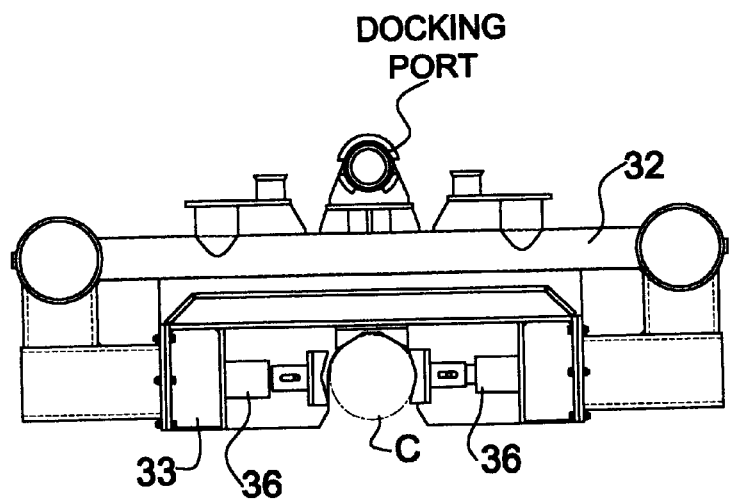
FIG. 5B is an end elevational view of the "reaction tool" of FIG. 5.
Figure 5C:
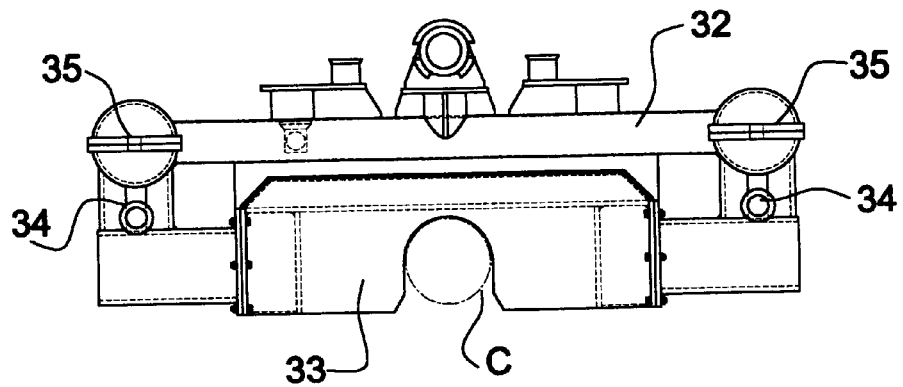
FIG. 5C is an opposite end elevational view of the "reaction tool" of FIG. 5.
Figure 5D:
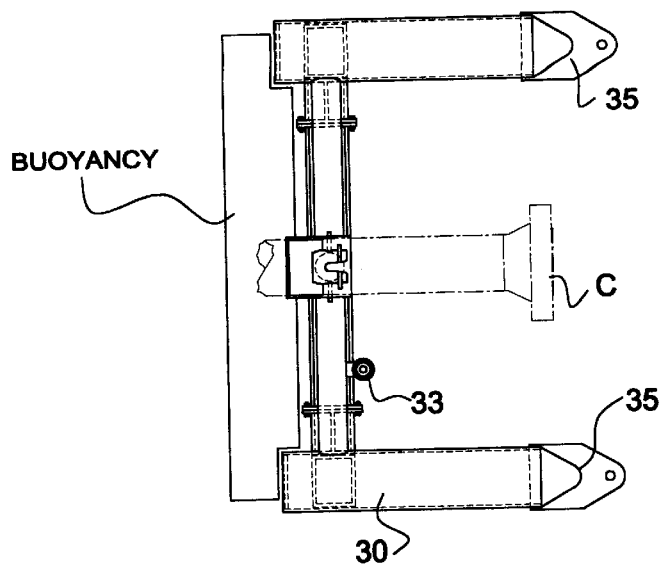
FIG. 5D is a plan view partly broken away of the "reaction yoke" part of the connection apparatus.
Figure 5E:
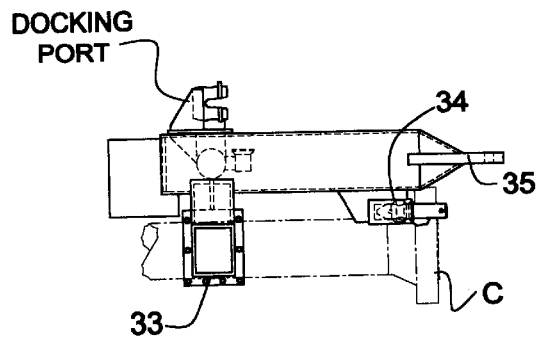
FIG. 5E is a side elevational view partly broken away of the "reaction yoke" of FIG. 5D.
Figures 5F, 5G:
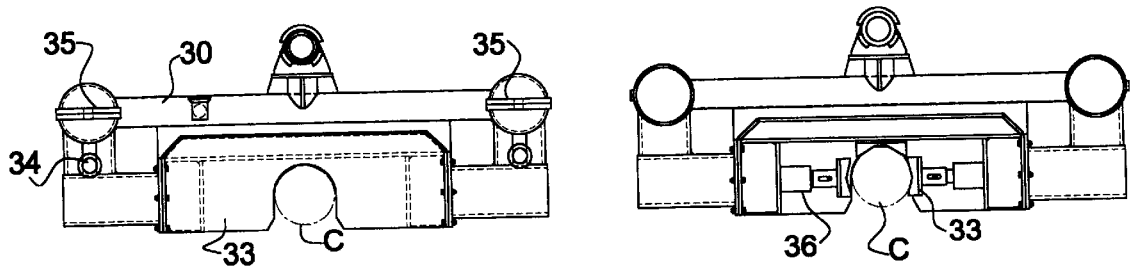
FIGS. 5F and 5G are each opposite end elevational views of the "reaction yoke" of FIG. 5D.
Figure 6:
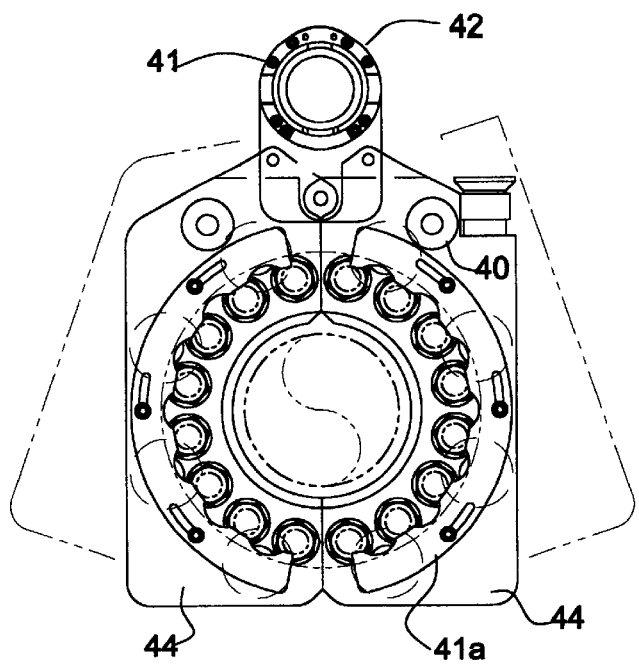
FIG. 6 is a plan view partly in phantom of the "flange connection tools" used to perform the connection between two conduits of bolted flange type.

The RT yoke 3 (FIG. 5a) is essentially a reduced length RT with only one clamp module fitted 33 (FIG. 5a). Clamp module size is as for RT 2.4 FLANGE CONNECTION TOOL The Flange Connection Tooling (FCT) system comprises a suite of tools whose purpose it is to effect a bolted flange connection and consists of the Bolt Insertion and Tensioning Tool (BITT) 46 (FIG. 6a) and the Nut Magazine Tool (NM) 41 (FIG. 6). The tools are deployed either pre-installed on the conduit, sub-sea deployed by ROV manipulator, or flown into position by the ROV, depending on the size of the conduit.

Part of the FCT system is a Nut Magazine 41 (FIG. 6) which is constructed in two hinged half housings 44 (FIG. 6) containing the fill quantity of nuts 41a required to connect the flanges. The two half housings 44 are hinged about the conduit centre-line which allows the half housings to be closed around the conduit.

There are two methods for deploying the NM 41 onto the conduit. The Nut Magazine 41 is placed over the conduit (at the Reaction Tool side) by the ROV using the ROV manipulator with a 'T' bar handle attached to the tool (for pipelines 4" to 10"). Alternatively, for conduits of 12" and above, the is flown directly onto the conduit by the ROV using a docking point 42 (FIG. 6). The half housings 44 (FIG. 6) can then be closed to lock the magazine around the conduit The Reaction Tool 30 (space permitting) or Reaction Tool Yoke 31 is employed to retain the magazine 41 axially and locate it at the rear of the conduit fixed flange.

Each nut 41*a* is held within a machined toothed sprocket. The sprockets are driven round by the operation of hydraulic motors, thus rotating the nuts to engage with the studs when they are introduced.

Hydraulic fluid is supplied to the motors by an ROV dual port hot stab 43 (FIG. 6). The hot stab receptacle is mounted near the docking point.

Rotary alignment of the magazine 41 to align each nut with the respective bolt hole, is achieved by the engagement of two guide pins from the Bolt insertion and Tensioning Tool (BITT) 45 (FIG. 6*a*) into holes machined into the Nut Magazine body. A tapered lead-in cone 40 (FIG. 6) is added to ease the engagement of the pins.

Figure 6A:
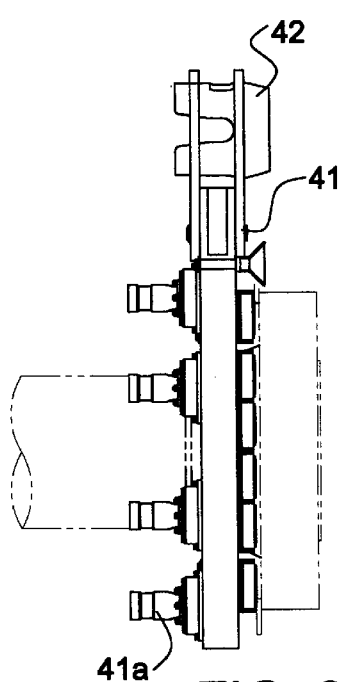
FIG. 6A is a side elevational view partly broken away of the "nut magazine tool" one of the "flange connection tools" of FIG. 6.
Figure 6B:
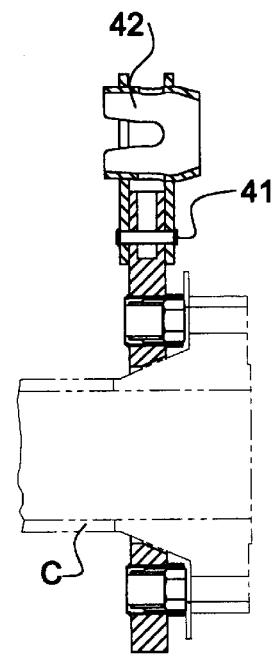
FIG. 6B is a cross sectional view partly broken away of FIG. 6A showing the "nut magazine tool", one of the "flange connection tools".
Figure 6C:
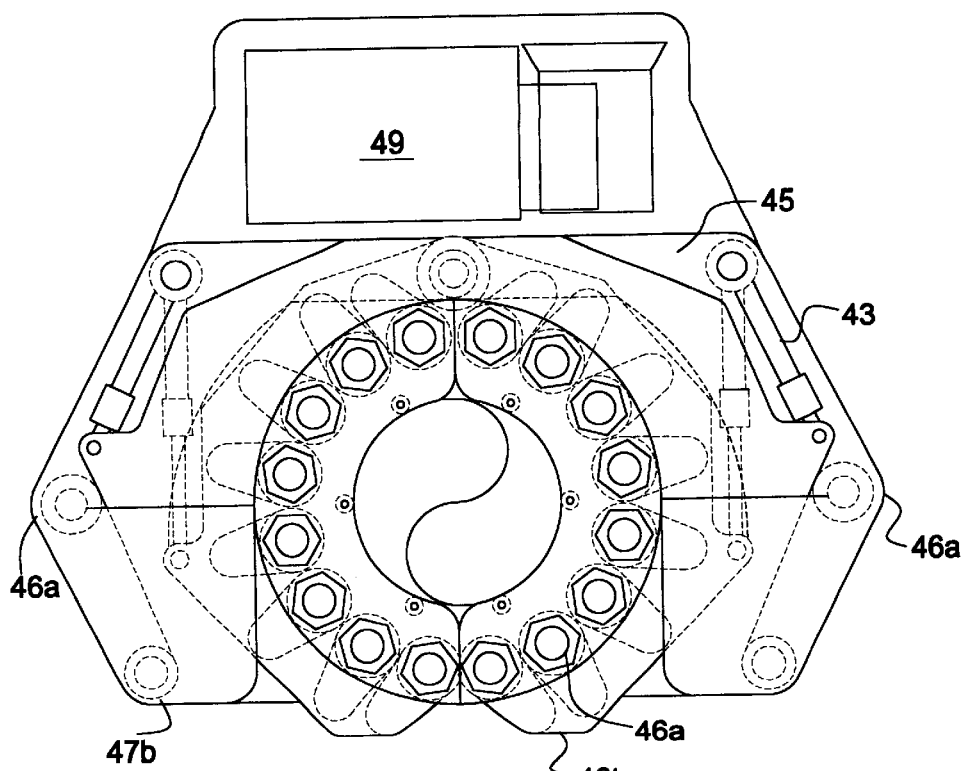
FIG. 6C is a plan view of the "bolt insertion and tensioning tool" part of the "flange connection tools".
Figure 6D:
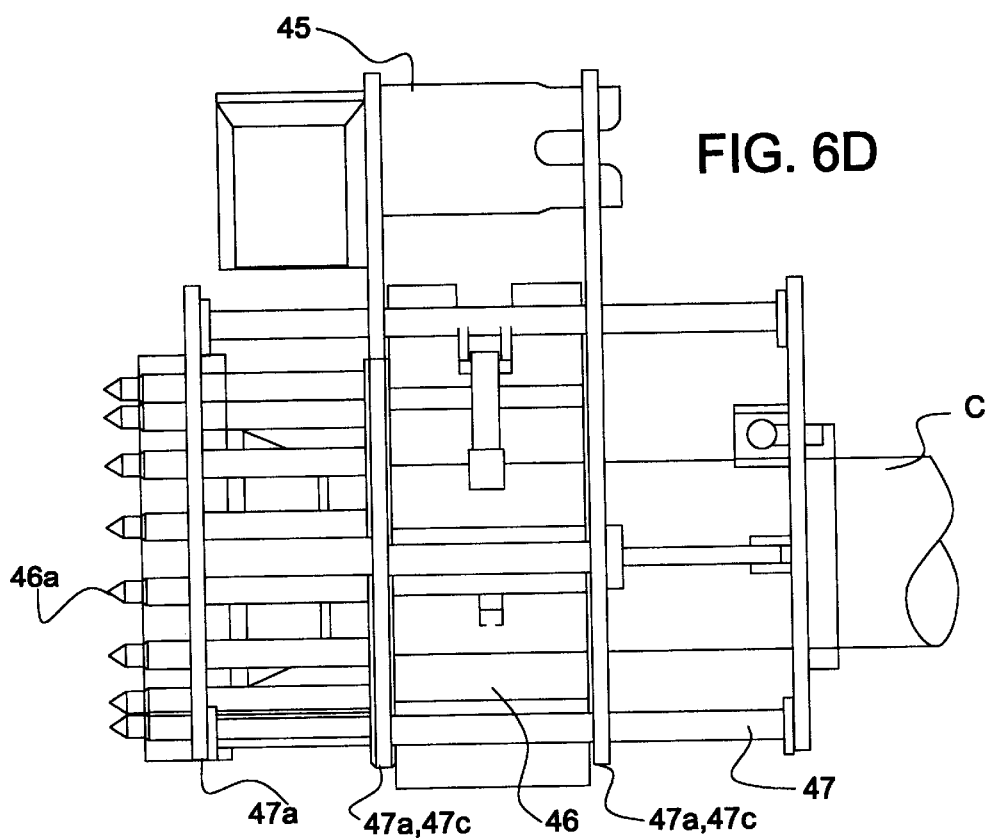
FIG. 6D is a side elevational view partly broken away of the "bolt insertion and tensioning tool" one of the "flange connection tools" used to perform the connection between two conduits of bolted flange type.

Solid buoyancy blocks are attached to sides of the magazine to reduce the in water weight of the tool and enable ROV handling Another part of the FCT system the Bolt Insertion and Tensioning Tool (BITT) 45 (FIG. 6*a*). This contains a magazine 46 of retained bolts 46*a* (FIG. 6*a*), referred to as the bolt magazine. The bolts are to be inserted through the conduit flanges as part of the flange connection operation. The magazine 46 also contains a quantity of stud tensioner units, which act upon the back of the studs during the bolt tension operation and into which the bolts are loaded before deployment.

The magazine is fixed within a surrounding deployment structure which provides clamp, rotation and extend hydraulic functions.

The BITT structure 47 (FIG. 6*a*) is constructed of a series of horseshoe shaped plates 47*a* which locate over the conduit flange. The plates are connected by slide tubes (which run from the rear plate to the front plate) and two linear, hydraulic cylinders.

The magazine is contained within two central horseshoe plates 47*c*. These two plates are fixed together by bearing housings which guide the unit along the slide tubes 47*b*.

The magazine 46 is constructed in two hinged half housings 46*a* containing (if space permits) 100% coverage of stud tensioners The two halves are pivoted to open and close around the pipe by two hydraulic clamp cylinders 48 (FIG. 6*a*).

The rear horseshoe plate of the BITT 45 locates against the AFT 20 (FIG. 4) which provides an axial reaction to the forward movement of the bolt magazine 46. The AFT 20 also provides a key which the horseshoe plate locates with to provide a reaction to rotational movement, Mounted at the rear of the BITT is a hydraulic cylinder which rotates the BITT structure 47 relative to the conduit. This aligns the bolts 46*a* contained in the BITT bolt magazine 46 with the bolt holes of the swivel flange located on the conduit. This cylinder is also capable of rotating the tool together with the swivel flange to align the bolts to the bolt holes of the fixed flange on the mating conduit.

The tensioner units (not shown) are made up of three parts, the load-bridge, the tensioner jack and the reaction nut.

For this application (ROV operated) the forward mounted load-bridge incorporates a motor gear drive to rotate the nut down the stud during tensioning. Each nut 41*a* is held within a machined toothed sprocket. Each sprocket is driven round by the operation of a hydraulic motor, thus rotating the nuts.

The tensioner jack is a conventional unit which has pressure intensified hydraulic fluid supplied to an annulus of the correct area to provide sufficient tension to the bolt 46*a*.

At the rear of the tensioner jack is the reaction nut. The reaction nut is a split collet which has a thread profile machined on its inside diameter. The reaction nut can be opened and closed around the threaded stud by the actuation of a small linear hydraulic cylinder or the operation of a hydraulic motor. This grips the stud and provides the reaction to the tensioner jack.

If it is not possible to achieve 100% coverage of the flange bolts with the tensioner units then the magazine will be divided into two parts A part which retains the 100% bolts, the bolt magazine 46, and a part which contains the 50% tensioner units, the tensioner magazine 46*t*. The bolt magazine shall operate as previously described, however the tensioner magazine requires a forward/aft movement and a rotation movement. These functions will be incorporated into the existing structure by the addition of slide tubes, bearing housings, and mounting plates, similar to those described above but with smaller strokes.

The BITT 45 tool contains an integrated control system based around a hydraulic valve manifold 49 (FIG. 6*a*). The manifold 49 will have a built-in facility to accommodate cameras and lighting on the tool Power to the manifold will be via a composite electrical/hydraulic hot stab connector deployed from the tooling skid using a manipulator ann.

The tool is deployed/removed from the conduit by the ROV utilising a docking point.

Solid buoyancy blocks are attached to the structure of the tool to reduce the in water weight and enable ROV handling after the bolts have been released from the tool.

2.5 Tooling Skid

To allow the ROV to interface with the AFT 20, RT 30, and FCT 40, and provide hydraulic and electrical power to them, a tooling Interface Skid 50 (FIG. 7), is necessary. The interface skid will also allow isolation of the AFT, RT and FCT hydraulic systems from the host ROV, thus preventing any contamination of the host ROV hydraulic system leading to operational complications and failure.

The skid 50 will comprise of an aluminium structure 51 (FIG. 7), containing an isolated hydraulic system 52 (FIG. 7), mechanical interface points 53 (FIG. 7) and buoyancy.

The skid 50 structure is designed to allow the ROV to interface with either the AFT, RT or FCT by means of mechanical docking probes 53 (FIG. 7).

Electrical and hydraulic connections will be made between the ROV and the T and the FCT via a sub-sea stab connector 54 (FIG. 7), located on the interface skid 50. This will pass hydraulic power, electrical power and command signals from the ROV to the AFT tooling manifold.

The skid 50 is also fitted with a dual port stab 55 (FIG. 7) to allow a switch-able hydraulic supply to be available for the RT and the lightweight H-frames.

Control of the mechanical docking probes and electro-hydraulic stab connector 54 is hydraulic from the ROV. Fail-safe systems installed on the skid will allow the ROV/skid to disengage from either tool after loss of hydraulic power.

Buoyancy will be contained within the skid structure to provide the skid 50 with a neutral in-water weight.

The skid 50 mechanically attached to the ROV and is used as an interface between the ROV and the tool. The skid independent hydraulic system is switched on by a pilot hydraulic signal from the ROV. This then makes hydraulic power available at the electro-hydraulic and dual port stabs 54, 55 on the skid 50.

Electrical power from the ROV is passed directly to the tool via the electro-hydraulic stab 54. Control of the tooling manifold on the AFT is then possible via electrical command signals from the ROV.

Hydraulic power on the skid 50 can be switched between automated electro-hydraulic stab, articulated arm deployed electro-hydraulic stab 54 articulated arm deployed hydraulic dual-port stabs 55 or a combination.

The tooling skid is fitted with a mechanical interface point at the front to allow the ROV to lock on to and pick-up either the connection equipment tools. The skid may also be fitted with vertical attachment points to reduce the loading on the front interface point.

2.6 OPERATIONS SUPPORT EQUIPMENT

Additional equipment is required to support the connection system operations, these include a Lightweight H-frame (LHF) 60 (FIG. 8), a pipeline Metrology System (not shown), a Seal Insertion and Removal Tool (SIRT) 65 (FIG. 9) and 66 (FIG. 9), a Blind Flange Removal Tool (BERT) 67 (FIG. 10), a Pig Launcher Removal Tool (PLRT), a Flange Spreader Tool (FST) (not shown), a Spoolpiece Installation Guide Tool (SIGT) 68 (FIG. 10), a Flange Cleaning Tool (FCT) (not shown), a Sub-sea Winch 69 (FIG. 11), and finally a Dead Man Anchor (not shown), each of which will be described in greater detail below.

2.6.1 H-FRAME

The Lightweight H-frame (LHF) 60 (FIG. 8), is an ROV deployed and operated tool, designed to lift and position rigid flowlines during tie-in operations. The system is of a low weight/low force, which guarantees its installation and operation by a standard work class ROV.

The H -Frame 60 can operate at up to 2500 m water depth. i.e. all operations are performed without any diver assistance. It can also be easily adapted as each field will have its own specific requirements.

H-frames are generally used in pairs.

Figure 8:
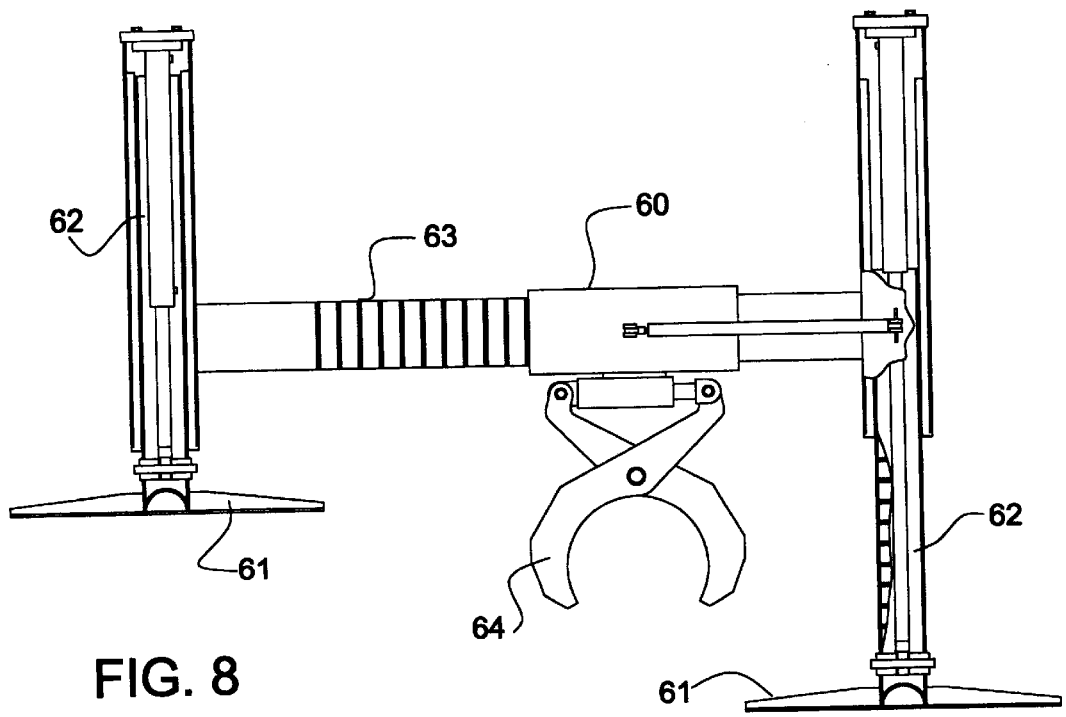
FIG. 8 is a side elevational view of an "H" frame for supporting a rigid conduit above the seabed.
Figure 8A:
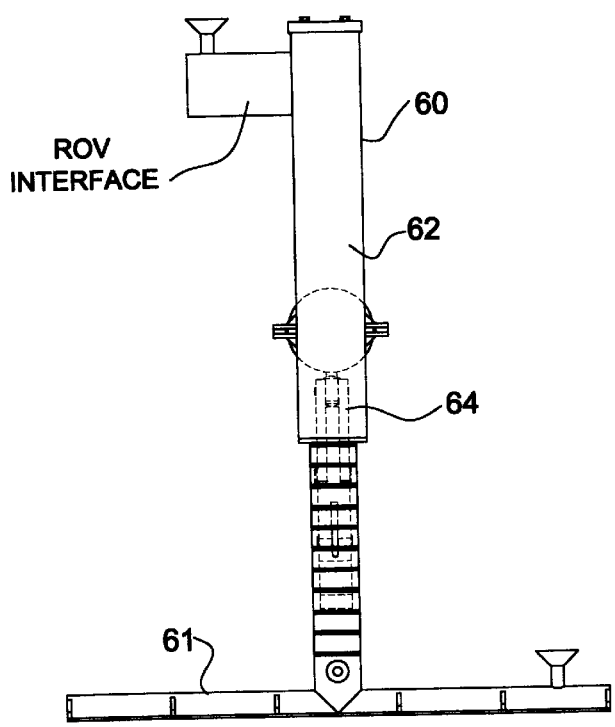
FIG. 8A is a side elevational view of FIG. 8.
Figure 9:
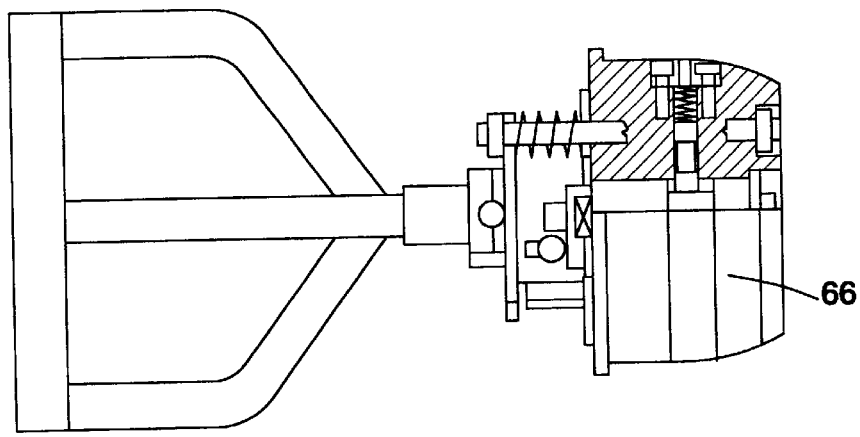
FIG. 9 is a side elevational view partly in cross section illustrating one of the ancillary tools used to support the connection apparatus.
Figure 9A:
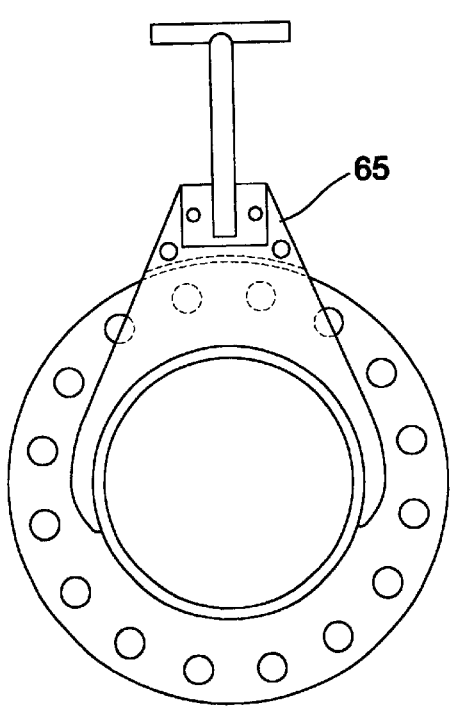
FIG. 9A is a side elevational view of the "seal insertion tool" that is deployed by the ROV manipulator in a carrier fitted with an ROV T-bar handle.
Figure 9B:
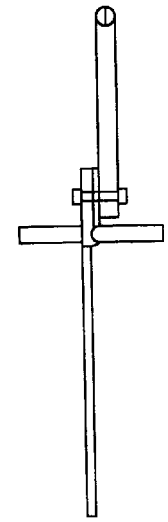
FIG. 9B is a side elevational view of the "seal insertion tool" alone as shown in FIG. 9A but without the bolt heads.

The LHF 60 is an aluminium structure composed of two foundations pads 61 (FIG. 8), two vertical legs 62 (FIG. 8), a connection frame 63 (FIG. 8) and a clamp 64 (FIG. 8).

The foundation pads 61 (FIG. 8) are designed to have stability in soft soil with low shear strength. However, in case a lower bearing capacity soil is found, by replacing the feet almost all soil types can be accommodated. The pads may also include two water injection hot-stabs to allow separation of the mud mats from the pads The two legs 62 (FIG. 8) can be extended in order to pick up a pipe buried 250 mm in the seabed and hold it up to 750 mm from the seabed and the clamp can be translated+/−500 mm with respect to the centre line of the structure.

The clamp 64 (FIG. 8) is a scissors type, hydraulically operated by a single acting cylinder. The jaws of the clamp are able to grab and lift a partially buried rigid pipeline. Through additional spacers, the same set of jaws can cope with different pipe sizes.

Dual port hydraulic hot stabs are provided on the LHF to allow the ROV to control the clamping, horizontal and vertical translation functions.

As the primary option, the LHF will be designed to be fully ROV deployable This will require a mechanical interface to allow the ROV to dock onto the LHF and sufficient buoyancy modules (syntactic foam) will be required to maintain the tool with a slightly negative in water weight.

2.6.2 METROLOGY SYSTEM

The Metrology System (not shown) can be one of two systems commercially available for subsea use with an ROy, there are either an Acoustic Metrology System or a Taut Wire Metrology System.

The Acoustic Metrology System consists of an ROV carried skid/frame that has mechanical interfaces on the front end, a pipeline engagement profile at the bottom and the acoustic metrology survey systems mounted within it. The acoustic equipment is primarily: a survey for measurement of orientation, relative to magnetic north; a USBL transponder, for positional measurement relative to the transponder array; and a depth transducer for accurate relative depth measurement.

All survey I metrology signal data from the systems on the skid is sent to the surface via the ROY umbilical.

The Taut Wire metrology system is a purely mechanical system that relies on protractors at the attached end points i.e. the two flanges or suitable steelwork attached to the blind flange and/or pig launcher, for visual measurement of relative angles.

The distance between the flanges is measured by a mechanical odometer system that measures wire as it is paid out when the ROY flies the connecting wire from one flange to the other.

2.6.3 SEAL INSERTION AND REMOVAL TOOL

The Seal Insertion Tool (SIT) 65 (FIG. 9), is deployed by the ROV manipulator in a carrier fitted with an ROV T-bar handle. The seal is suspended in a support structure and located Onto the ends of the partially exposed bolt heads. Once the flange bolts are fully inserted the insertion tool may be removed.

The Seal Removal Tool (SRT) 66 (FIG. 9), is a contingency tool in the event that the face seal does not come away with the blind flange and remains attached in the groove of the weld-neck flange.

The tool will have a cylindrical body with a conical lead-in profile and will be inserted by ROV manipulator into the weld-neck flange. A pair of locking shoes will be actuated by hydraulic cylinder to "friction grip" the inside of the seal ring. The seal assembly can then be jacked off the sealing face without damage to the face.

2.6.4 BLIND FLANGE REMOVAL TOOL

Figure 10:
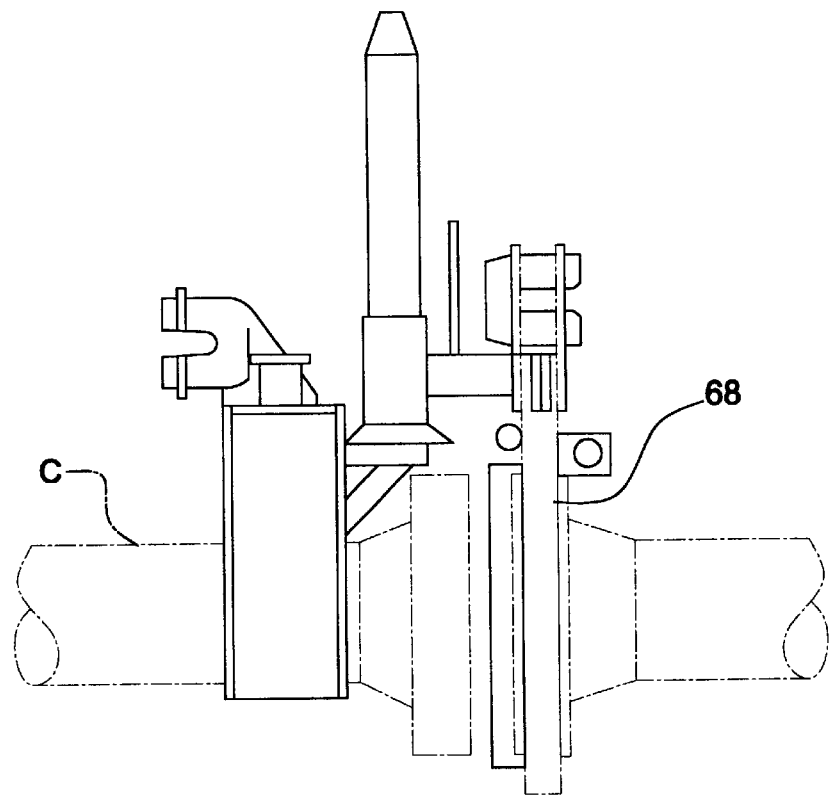
FIG. 10 is a side elevational view in phantom and partly broken away of a "spoolpiece installation guide tool".
Figure 10A:
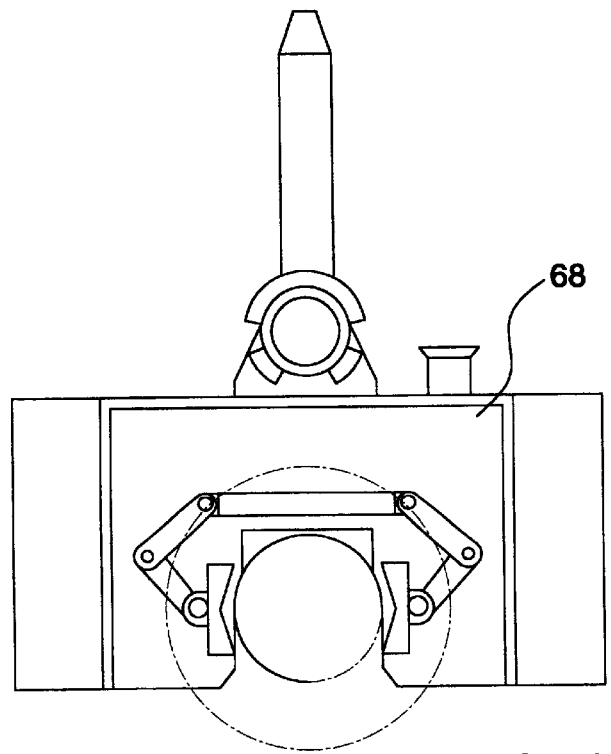
FIG. 10A is an end view of FIG. 10.
Figure 10C:
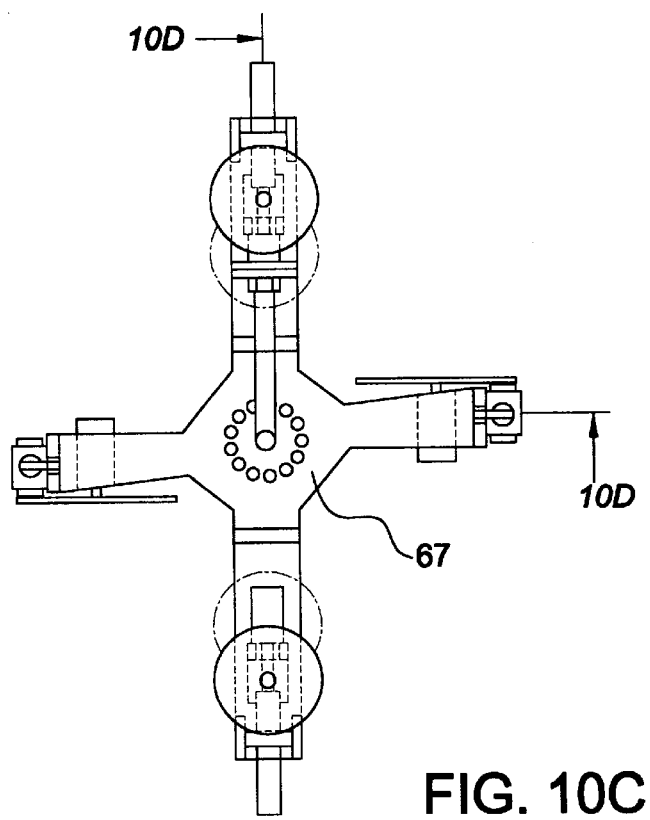
FIG. 10C is an end elevation of FIG. 10D.
Figure 10D:
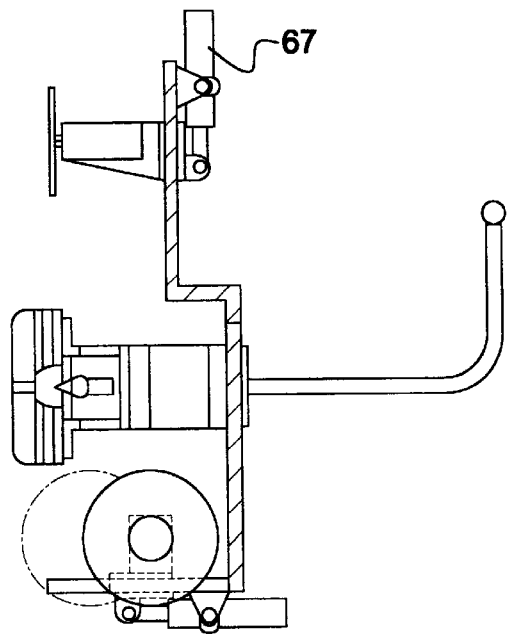
FIG. 10D is a side elevational view of the "blind flange removal tool".
Figure 11:
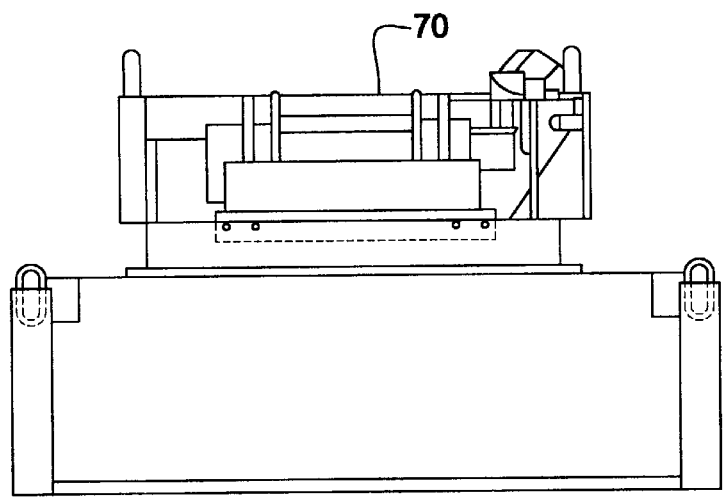
FIG. 11 is a side elevational view of the subsea utility wench.
Figure 11A:
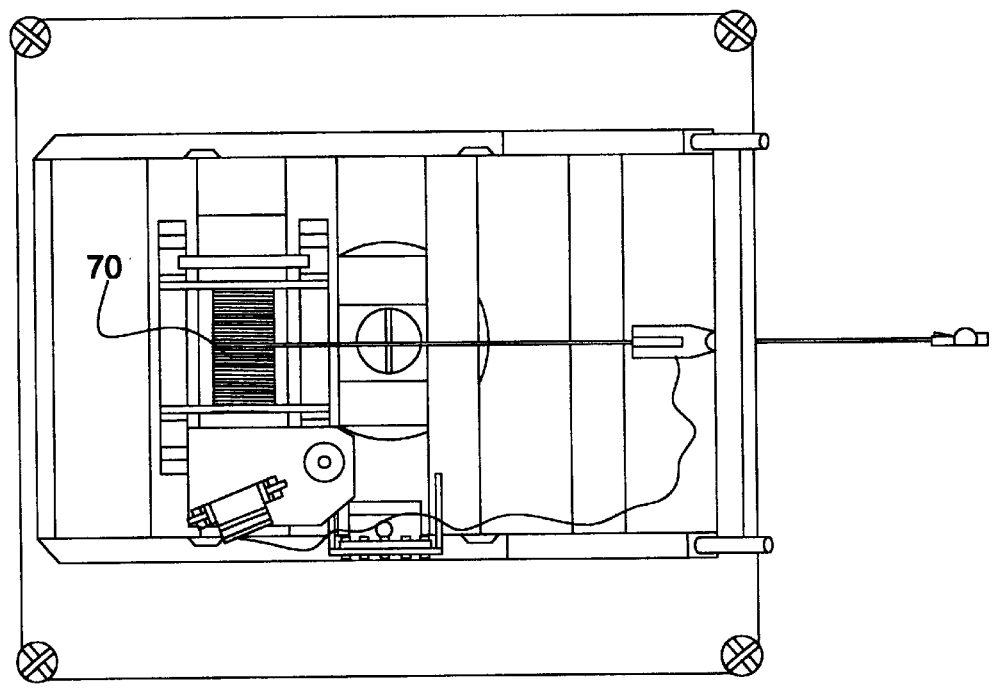
FIG. 11A is a plan view of FIG. 11.
Figure 11B:
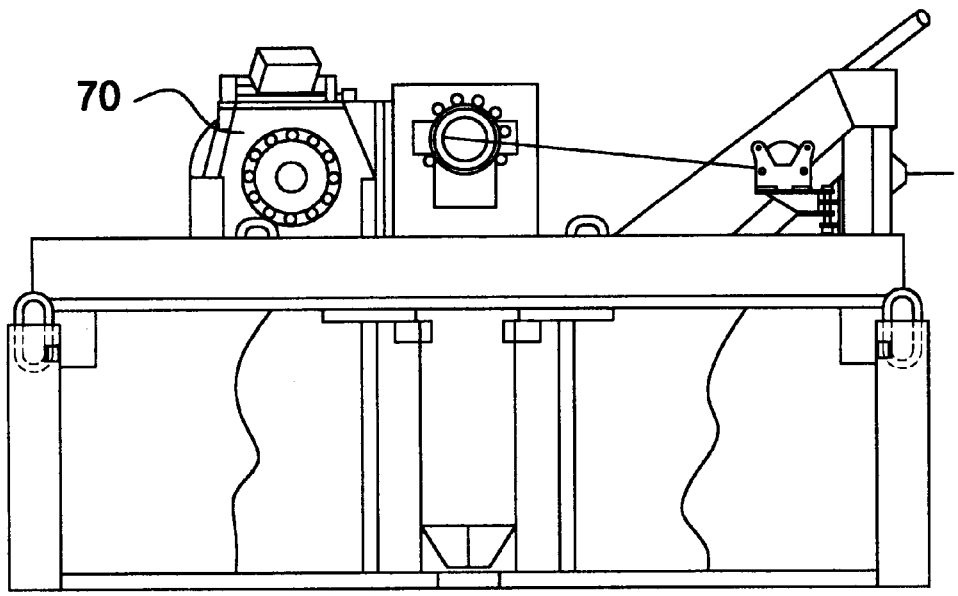
FIG. 11B is a side elevational view of FIG. 11A.
Figure 11C:
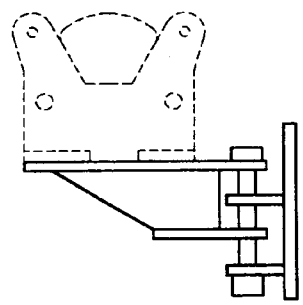
FIG. 11C is a side elevational view partly in phantom of a portion of FIG. 11A.

The Blind Flange Removal Tool (BFRT) 67 (FIG. 10), shown in detail in FIG. 10, is an ROV operated tool, designed to cut the studs. and nuts on a blind flange to enable removal. The is divided in three parts. the locking system; the stud cutting system; and the nut cutting system The locking system is a docking nose which is positioned in the flange interface and locks in with four dogs hydraulically operated The surface in contact is knurled to provide a better grip. The flange interface is a simple cylinder with an internal diameter to suit the BFRT nose, with a guiding cone entrance.

On the locking system is mounted a rotary actuator to allow 180 degree rotation of the cutting tools composed of two horizontal, hydraulic motor driven grinding discs mounted both sides of the rotary actuator, which cuts the studs above the nuts.

2.6.5 PIG LAUNCHER REMOVAL TOOL

The pig launcher removal tool (not shown) is a traditional ROV operated torque tool. Due to the reduced pressures during pigging operation, the pig launcher bolts will not be tensioned and can be removed using standard tooling.

2.6.6 FLANGE SPREADER TOOL

The flange spreader tool (not shown) is a contingency tool in the event that it is, not possible to remove the pig launcher or blind flange once the flange fixing bolts I nuts have been removed.

The flange spreader tool will consist of a steel framework which is deployed over the flange joint. Within the frame is contained a pair of commercially available flange spreading tools which can be extended forward to engage in the flange joint. The tools are then operated in the conventional manner by extending a chisel head into the joint to effect separation.

26.7 SPOOLPIECE INSTALLATION GUIDE TOOL

The Spoolpiece Installation Guide Tool (SIGT) 68 (FIG. 10), also acts as protection for the pre-installed flange face seal.

The SIGT consists of two mating parts: the male guide; and the female receptacle.

The male guide consists of an ROV deployable pipe clamp fitted with a conventional guide post. The clamp is deployed onto the pipeline prior to installation of the spoolpiece by the ROV and activated through a hydraulic hot stab. An accumulator maintains the clamp in position and the ROV can leave the area whilst the spoolpiece is deployed The female receptacle is installed on the spoolpiece mating flange diameter prior to deployment of the spoolpiece and also acts as a flange seal face protector. The guide is held in place by a clamp which is maintained by an accumulator. During spoolpiece deployment the ROY monitors and guides the female receptacle into position on the male guide post.

Once deployment of the spoolpiece is complete, the female guide receptacle is opened and removed by the ROV. The male guide can then also be removed by the ROY. Both items are removed to the tooling basket.

2.6.8 FLANGE CLEANING TOOL

The Flange Cleaning Tool (not shown) is a hydraulically operated rotating brush in conjunction with a LP Water jet system. The brush is made up from soft scouring pads several layers thick, secured to a central spindle protected to prevent 'metal to metal' contact on the flange face and seal area.

The brush may be required to be changed out due to wear on prolonged cleaning sections The brush is mounted on to a small, high speed hydraulic motor with a T-Bar suitable for manipulator operation. Incorporated into the T-bar is a bracket for mounting a camera and light unit to give 'close-up' Pre Clean inspection, continuous monitoring during Flange Face Cleaning and Post cleaning inspection.

A LP Water Jet is used to remove light debris and mud from the flange face and for final clean-up before the post cleaning inspection.

An option on the rotating brush unit is a HP water jet system to clean the Flange Face set to a level safe for the Flange material preventing any possibility of damage.

2.6.9 SUBSEA UTILITY WINCH

The Sub-Sea Utility Winch 70 (FIG. 11), is an ROV operated hydraulic winch mounted on a swivel frame on a clump weight base. It will be used to aid the positioning of the rigid flow-line and spool-piece from 4" OD up to 24" OD during tie in operations. The sub-sea winch can operate at 2500 metre water depth. i.e. all operations are performed without any diver assistance.

The Sub-sea winch consists of a base frame, winch support frame turntable (3600) and a hydraulic winch system.

The Base frame is designed to keep the winch in position during pull in of the winch wire rope. The base frame consists of a steel frame with a concrete in-fill. It also has four lift points for easy deployment.

The winch support frame can rotate 360° horizontally to allow alignment. This includes cable storage bull horns that allows the winch wire rope to be free pulled out from the winch without hydraulic actuation The support frame is constructed from steel.

The sub-sea winch system consists of a hydraulic motor connected to the wire rope drum via a gearbox and hydraulic brake. The winch has a line feed in/out measurement system in the form of a turns counter.

For docking with the ROV a docking cone and a dual port hot-stab receptacle are located on the top of the structure. The dual port hot-stab hydraulically actuates the winch in and out operations of the sub-sea winch using the ROV.

2.6.10 DEAD MAN ANCHOR

The dead man anchor (not shown) or bollard clump weight as it is sometimes called, is essentially a steel frame/concrete in-fill gravity anchor with a bollard centrally mounted. It is a passive structure and provides a reaction point for pulling operations sub-sea, such as pulling the pig launcher away from the flow-line or coarse alignment of the spool-piece.

3. PROCEDURE FOR CONNECTING A RIGID CONDUIT TO A FLEXIBLE CONDUIT

Figure 12:
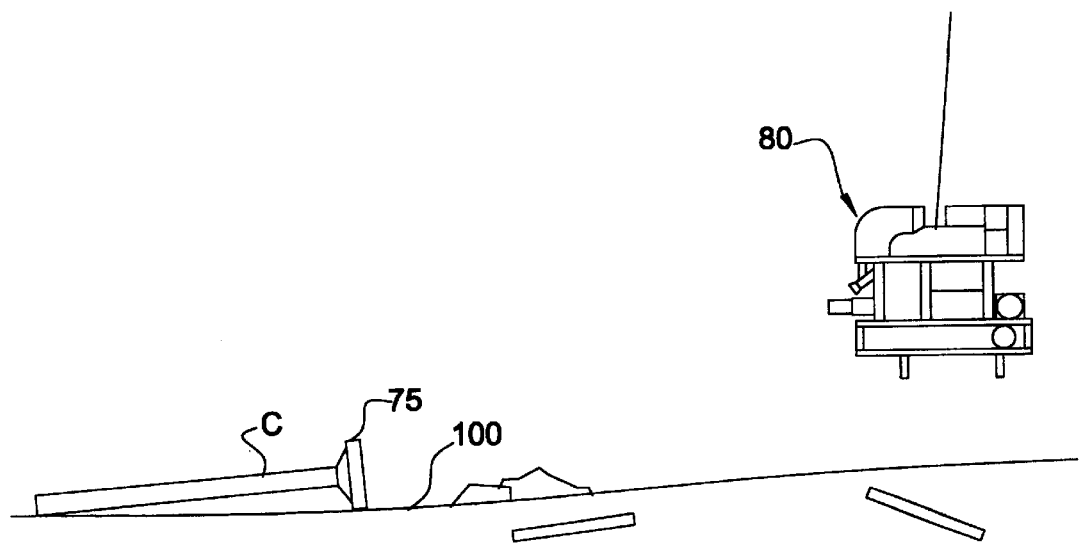
FIG. 12 is a schematic view of the initial stage of the operation of connecting two conduits together, one of which is flexible.
Figure 12A:
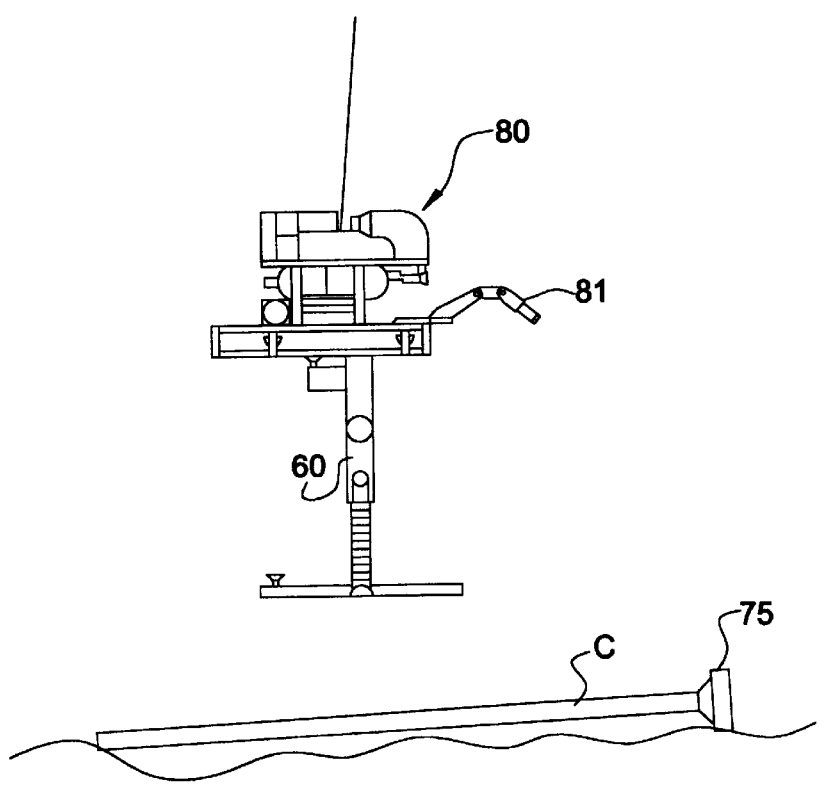
FIG. 12A is a schematic view of the first stage of the operation in connecting two conduits together, one of which is flexible.
Figure 12B:
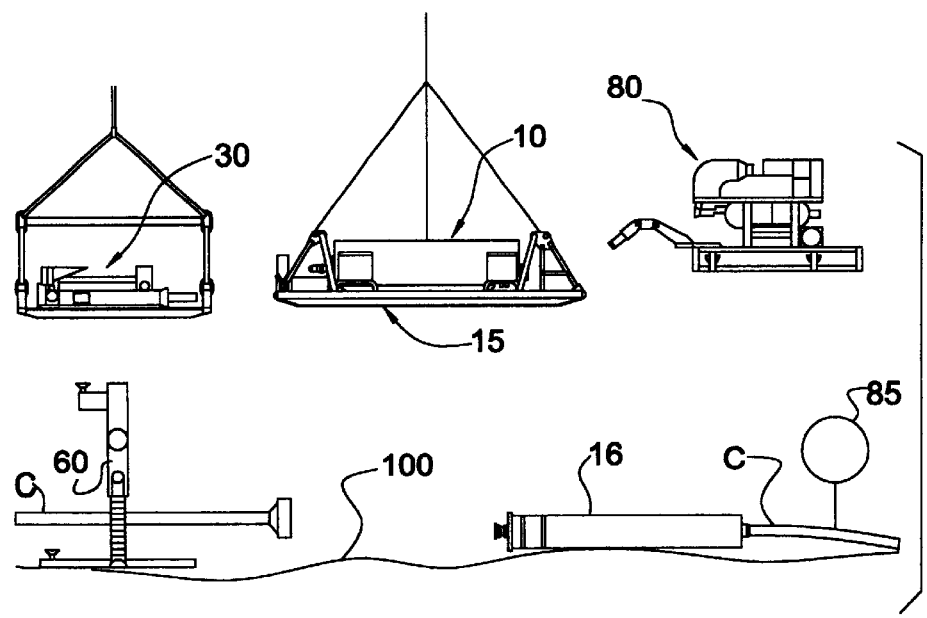
FIG. 12B is a schematic view of a second stage of the operation.
Figure 12C:
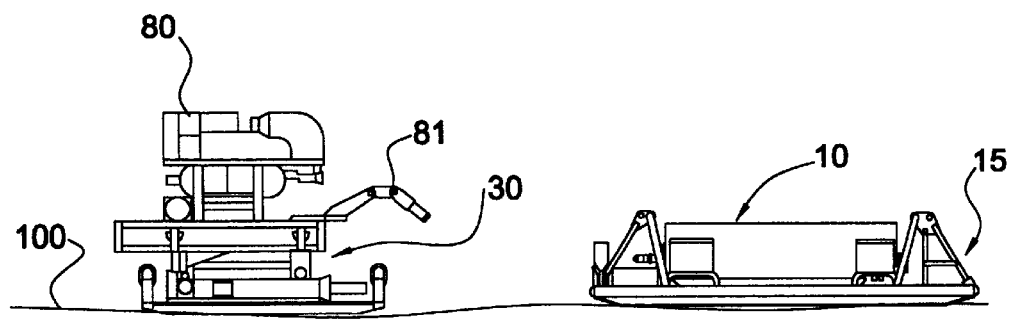
FIG. 12C is a schematic view of a further stage of the operation.
Figure 14:
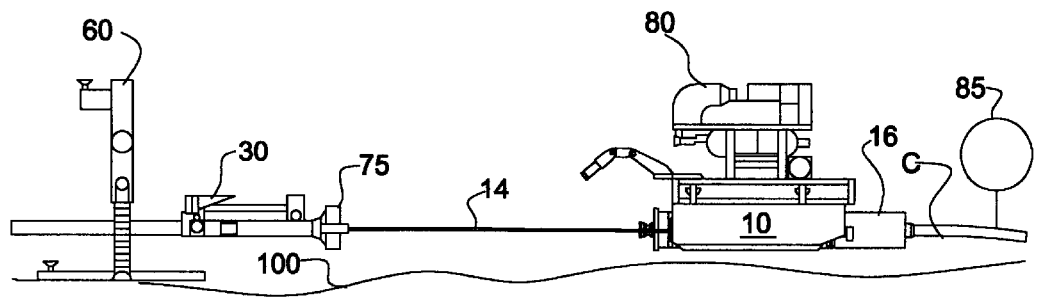
Figure 14A:
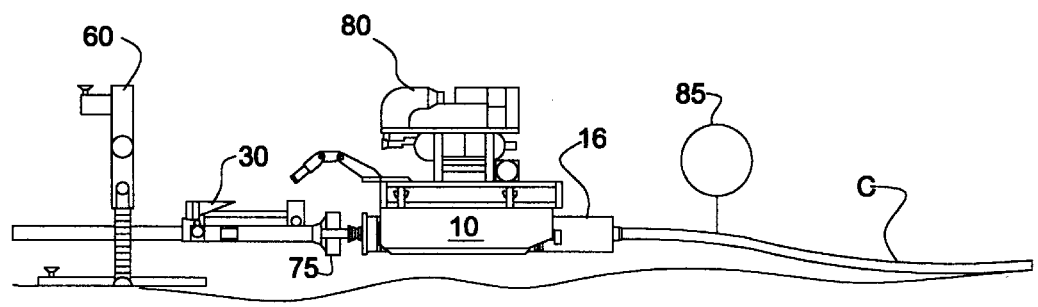
Figure 14B:
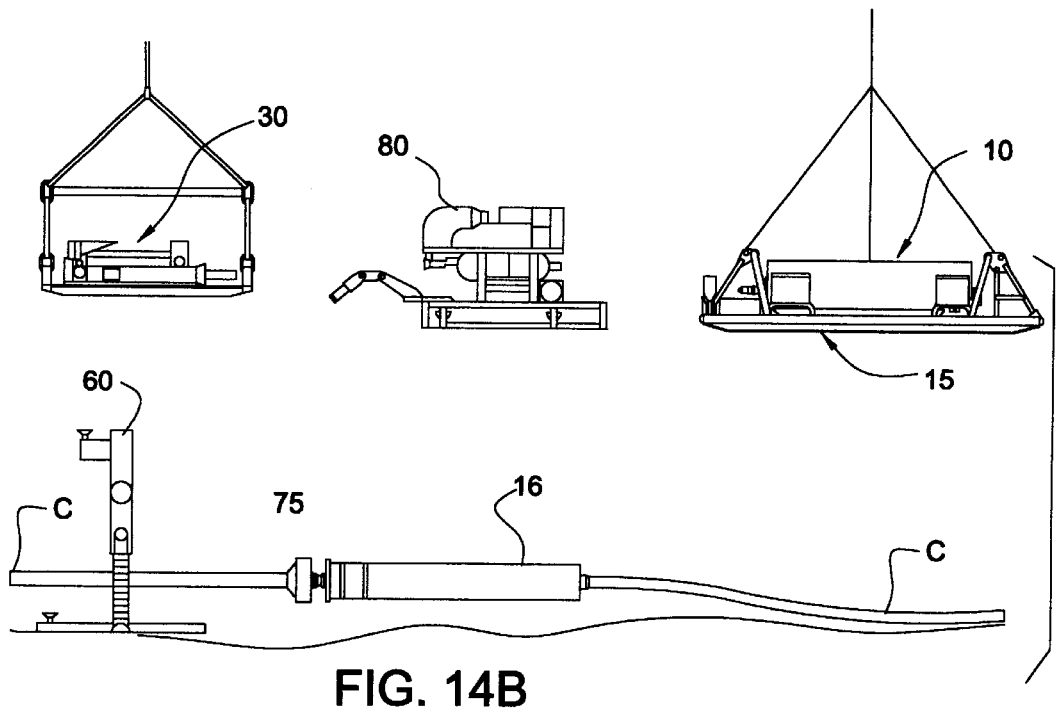
Figure 14C:
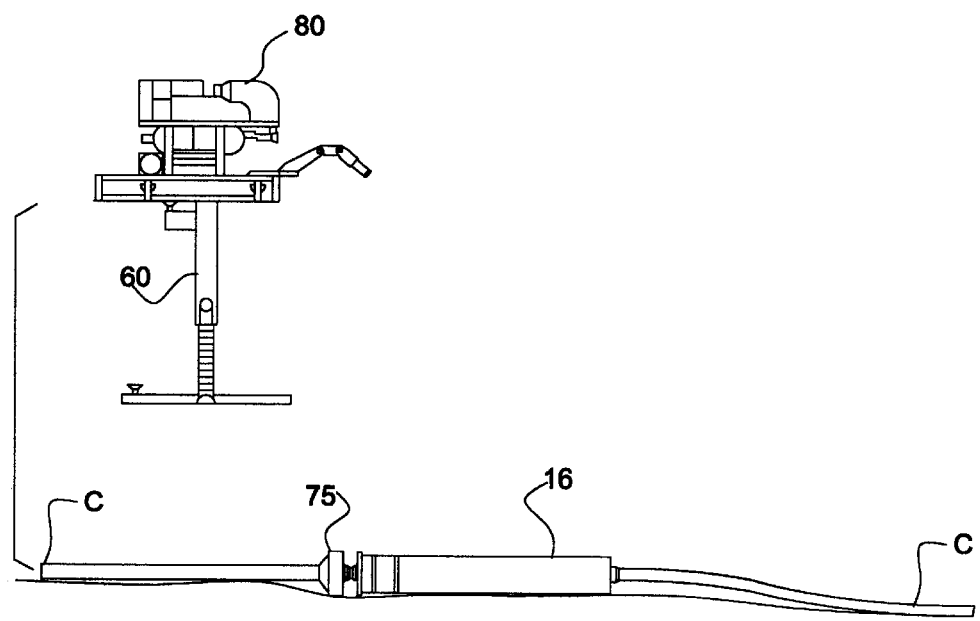

Referring now to a first embodiment of the method of connecting underwater conduits together, shown in FIGS. 12, 13 and 14, a flexible conduit C, fitted with a suitable DECS interface collar 16 (FIG. 12) is laid down on the seabed 100 (FIG. 12) within a target area. A LHF 60 (FIG. 12) is deployed and clamped to the flexible conduit C' in accordance with known techniques. The LHF 60 (FIG. 12) is launched from a support vessel moored above the connection site. The interface collar 16 (FIG. 12) allows the DFCS 10 (FIG. 12) described above to be locked on to the flexible conduit C'.

The RT 30 (FIG. 12) is located on its deployment frame. The DFCS 10 (FIG. 12) is located on its deployment frame 15 (FIG. 12) together with a torque tool, seal ring replacement tool and spare connector seal (not shown).

Depending on the size of the conduit C and on the height of the connector 75 (FIG. 12) from the seabed 100 (FIG. 12). buoyancy modules 85 (FIG. 12) may be installed on the second conduit C'. The said buoyancy modules can be inflated from a single air source, located on the sea bed, and operated by the remotely operated vehicle.

A Remotely Operated Vehicle (ROV) 80 (FIG. 12) is launched to the work site from the support vessel and performs a survey of the said work site. Information retrieved from the survey is fed back to the support vessel so that the appropriate parameters for the connection can be determined. The remotely operated vehicle is provided with an articulated manipulation arm 81 (FIG. 12) which allows the remotely operated vehicle to pick up selected objects.

The ROV 80 (FIG. 12) docks onto the LI-IF 60 (FIG. 12) and places the frame in position around the free end of the first conduit C. The ROV then operates the clamp 64 (FIG. 8) of the frame which grabs and holds the rigid conduit C in position.

The ROV is disconnected from the LHF 60 (FIG. 12) and positioned to retrieve the RT 30 (FIG. 12) from its deployment frame and carry the RT 30 (FIG. 12) to a position above the conduit C. The RT 30 (FIG. 13) is then lowered onto the conduit C. The clamp module 33 (FIG. 5) of the RT are activated in order to lock the RT in position on the conduit C.

The ROV is then operated to remove the protection cap from the said rigid conduit C.

The ROV then docks onto the DFCS 10 (FIG. 13) to make up its electro-hydraulic connector. The conduit clamp arms of the DFCS are then opened to enable the DECS to be retrieved from the deployment frame.

The ROV is then positioned adjacent the RT 30 (FIG. 13) and moves forward to dock the anchors 12 (FIG. 1) of the DFCS into the receptacles 34 (FIG. 5) of the RT. This action anchors the ends of the two DFCS winches 13 (FIG. 1) to the RT 30.

In FIG. 13 the ROV activates the DFCS winches 13 (FIG. 1) to pay Out winch ropes 14 (FIG. 13) and, at the same time moves back to a position above the interface collar 16 (FIG. 13) of the flexible conduit C' The ROV then lowers the DECS 10 (FIG. 13) onto the second conduit C', over the interface collar 75 (FIG. 14) and activates the conduit clamp arms. This pulls the flexible conduit out of the sand/mud at the sea bed and locks the DFCS 10 (FIG. 14) to it.

Mechanical indicators (not shown) provide a means to verify that the DFCS 10 (FIG. 10) is securely engaged over the axial load reaction shear keys of the interface collar 16(FIG. 10).

The DFCS winches 13 (FIG. 1) are activated to commence pulling of the flexible conduit C' up to the rigid conduit C. The winch rope tensioners are monitored during this operation to allow for adjustment if necessary. If the conduit C' is not horizontally aligned on the seabed 100 (FIG. 14) when the two conduits are close together and the hub (not shown) arrives at the connector 75 (FIG. 14), a sub-sea utility winch 70 (FIG. 11) may be used to pull the conduit C' into position using a standard procedure.

The said sub-sea utility winch 70 (FIG. 11) is deployed on the seabed from the surface support vessel, whereby the ROV can connect the wire rope from the said winch directly or via a Dead Man Anchor to the said flexible conduit. Once connected it can perform the following two functions; pull the conduit towards the sub-sea utility winch; then lock in place the position of the conduit after pulling.

The winch on the sub-sea utility winch is actuated by a dual port hot-stab from the ROV that powers the hydraulic motor on the winch. If necessary the direction of the force being applied can be deflected using the said Dead Man Anchor until the alignment of the free ends of the conduits has been corrected. The method of locking the wire rope in position is by the use of a braking system on the winch wire drum.

If required, the final vertical alignment of the conduit C' may be achieved by adjusting the position of the buoyancy modules 85 (FIG. 14) along its length.

The DFCS 10 (FIG. 14) continues to pull the said flexible conduit C' up to the said rigid conduit termination until the two are a defined distance apart. In FIG. 14 the conduit hub (not shown) is drawn into the connector 75 (FIG. 14).

The flexible conduit protection cap is removed from the end of the said flexible conduit C' by the ROV manipulator arm 81 (FIG. 14).

The said DFCS winches 13 (FIG. 1) continue to operate until the said flexible conduit hub is at a certain distance from the said rigid conduit hub. The final part of the pull-in is then performed using the said DFCS winches with the said DFCS slide tubes arresting the motion. This provides a controlled method of aligning the two as the final distance is made up. Visual confirmation is made with the ROV cameras.

The said ROV makes up the connection, the connector being a clamp connector, a collett connector, a bolted flange connector or any other suitable connection device.

An air hot stab is taken from the above mentioned seal ring test system (located on the ROV) and is inserted into a receptacle on the mated assembly. The said air hot stab is pressurised and the pressure monitored. This provides an external seal test verify the integrity of the seal between the two conduits.

If the pressure test fails, the joint is opened and the said flexible conduit retracted by hydraulically extending the said DFCS slide tubes. The ROV retrieves the seal ring replacement tool from the said DFCS deployment frame and uses it to remove the seal and replace it with a new one. The said flexible conduit is again pulled up and the procedure repeated until the seal test result is satisfactory.

Once a successful seal test has been completed the said DFCS disconnects the stab-in anchors from the said RT receptacles and unclasps and the said DFCS 10 (FIG. 1) from the said flexible conduit C'. The DFCS and said tools are returned to the respective deployment frames which are then ready for recovery to the surface.

The ROV docks onto the said RT 30 (FIG. 14) and removes it from the rigid conduit C and returns it to its deployment frame which is then ready for recovery to the surface.

The ROV releases the completed conduit assembly by releasing the clamp means 64 (FIG. 8) of the said LHF 60 (FIG. 14) which is then ready for recovery to the surface, additionally the ROy then deflates and recovers any buoyancy modules 85 (FIG. 14) which have been used.

FIG. 14 also shows the recovery to the surface of DFCS 10, RT 30 and the recovery to the surface of the LHF.

FIGS. 15 and 16 show the connection procedure to connect a flexible conduit to a subsea structure (xmas tree) using the DFCS.

The method outlined above describes the connection of the rigid conduit C to a flexible conduit C' However, in accordance with a second embodiment of the invention, a rigid conduit C may be connected to another rigid conduit C" and the respective steps of this alternative method are described below. Similar components from the first method are described below Similar components from the first method have been given the same reference numerals for ease of understanding.

4. PROCEDURE FOR CONNECTING A RIGID CONDUIT A RIGID CONDUIT

Figure 17:
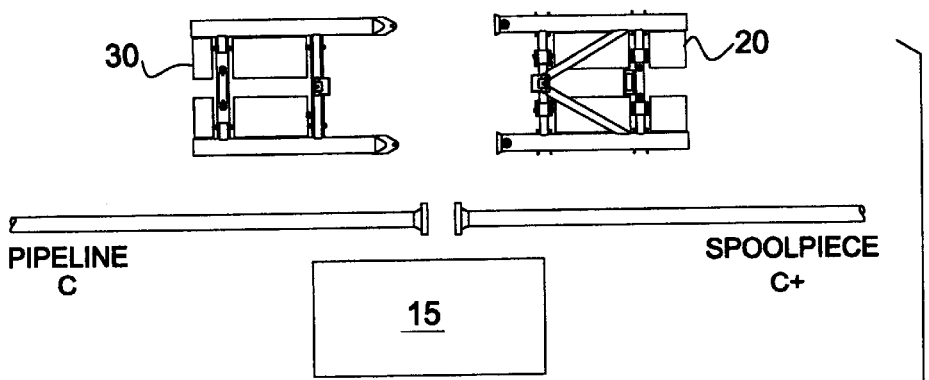
Figure 17A:
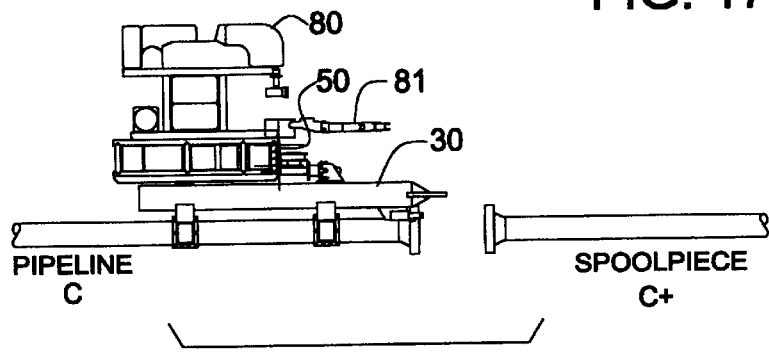
Figure 17B:
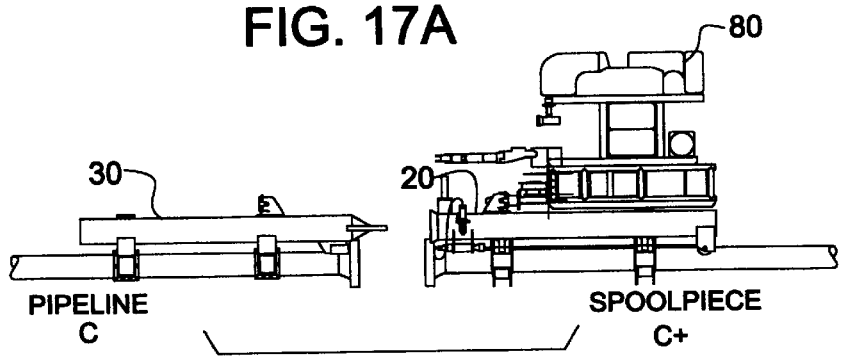
Figure 17C:
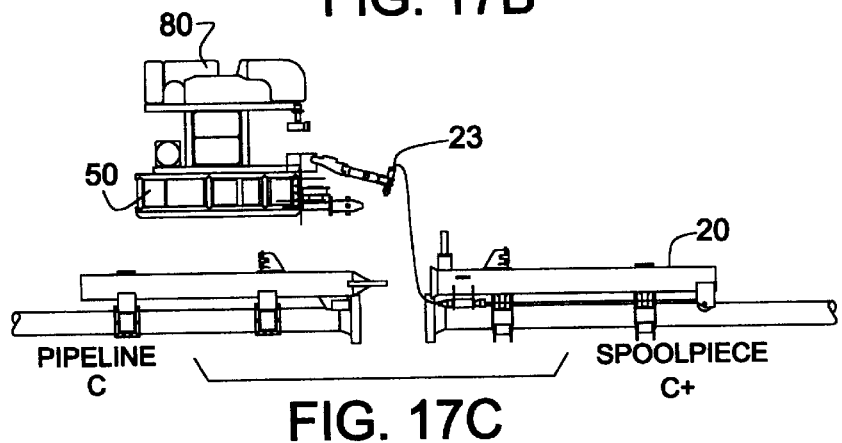

Referring now to a second embodiment of the method of connecting underwater conduits together, in FIGS. 17 to 21 a rigid conduit C is connected to another rigid conduit by the inclusion of a rigid spoolpiece C+ (FIG. 17)

The two rigid conduits C and C" (FIG. 17) are laid on the seabed in accordance with known techniques (one of the conduits could be part of an underwater structure such as a flowline bases, a x-mas trees, a template or similar)

As shown in FIG. 12 the ROV 80 is launched to the worksite from the surface support vessel and performs a site survey sending information back to the support vessel for analysis. The ROV will locate and remove any significant debris, and dredge any problem areas around the conduit flanges for access.

The chosen metrology equipment is launched to the seabed within a deployment basket or onboard the ROV. The ROV will then operate said metrology equipment to relay conduit flange position information back to the support vessel for analysis From this information a rigid spoolpiece C+ is fabricated onboard the support vessel to fit between the two rigid conduits.

Operations support equipment is launched to the seabed from the support vessel. The type of support equipment required will depend upon field layout and hardware employed by field constructors. As a minimum two LHF's 60 (FIG. 8), a sub-sea utility winch 70 (FIG. 11) and a dead man anchor are required.

The LHF's are deployed on the seabed by the vessel crane, whereby the clamp is then located straddling the conduit using the ROy. Once in position the LHF can perform the following two functions; clamp onto the rigid conduit with the lifting clamp 64 (FIG. 8); apply a horizontal and vertical movement to allow rough positioning of the rigid conduit.

Figure 18:
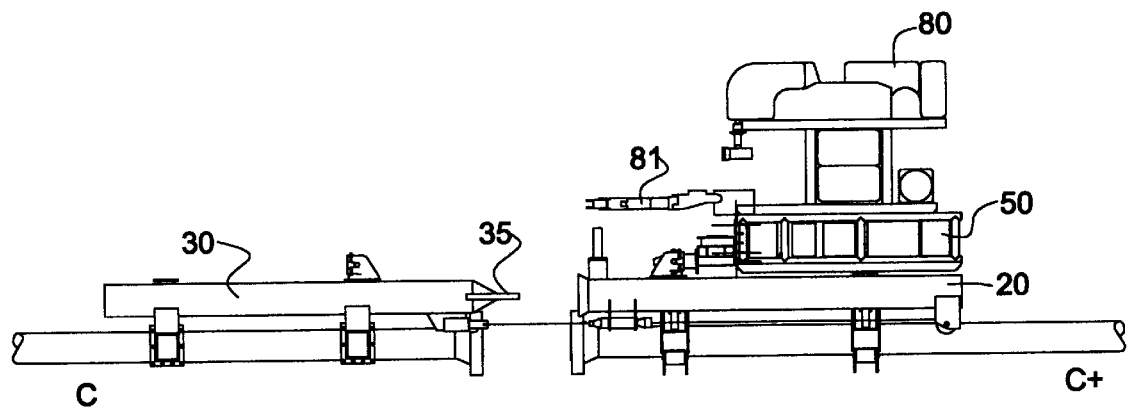
Figure 18A:
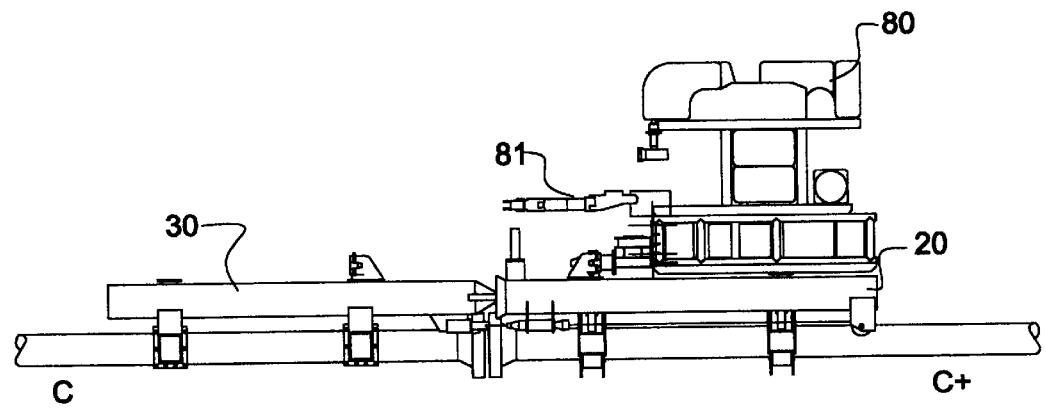
Figure 18B:
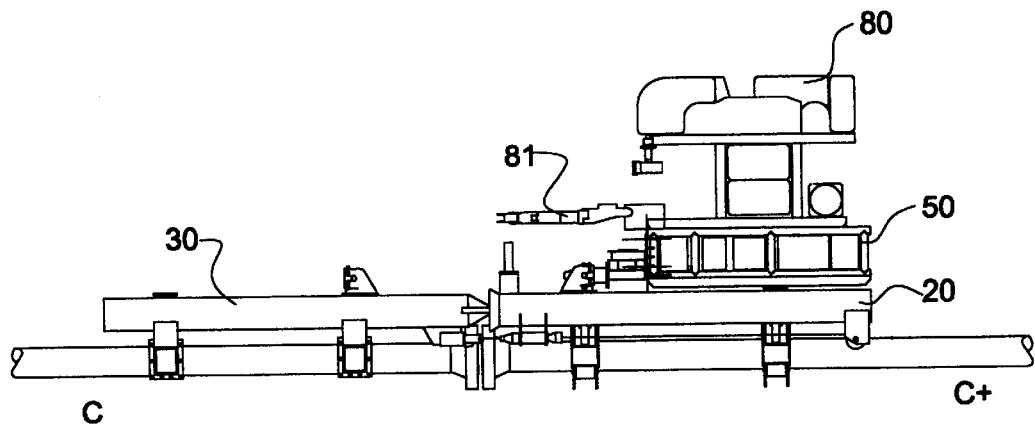
Figure 18C:
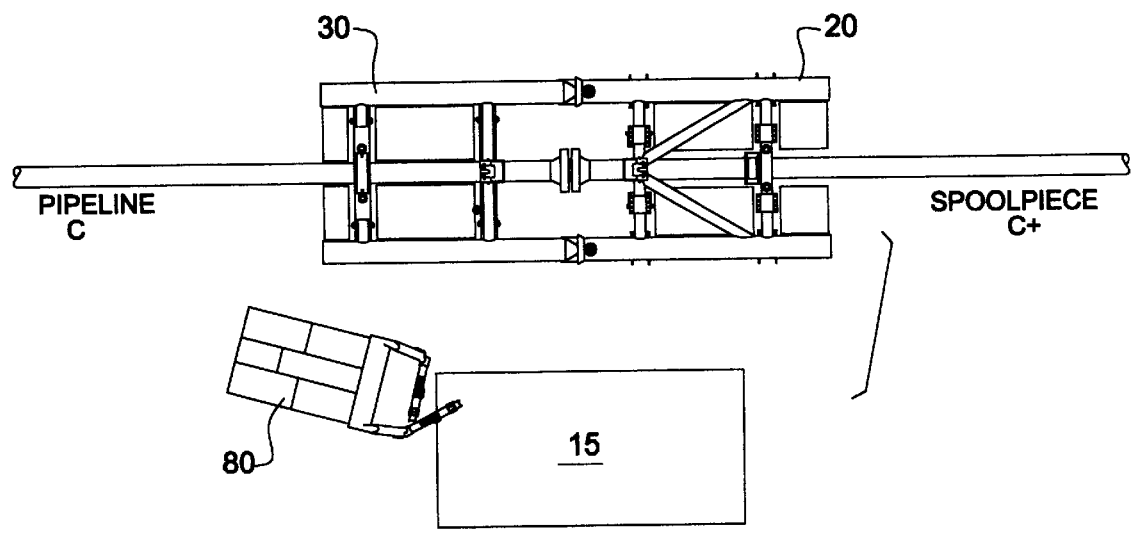

The LHIF clamp 64 (FIG. 8) is actuated by a hydraulic cylinder (activated by a hotstab from the ROV) that applies a 5 Tonne force to clamp securely onto the rigid conduit. The horizontal positioning of the rigid conduit is achieved by the use of two horizontally mounted hydraulic cylinders. These, in turn, move a sliding collar which is attached to the lifting clamp The vertical positioning of the rigid conduit is achieved by the use of two vertically mounted hydraulic cylinders 62. These are attached to feet 6] (FIG. 8) which react against the seabed Further preparation work may take place at this stage, as shown in FIG. 18. i.e removal of the 1st end rigid conduit C flange protection cap or blind flange using the Blind Flange Removal Tool (BFRT) 67 (FIG. 10), removal of old seal using the Seal Removal Tool (SRT) 66 (FIG. 9), seal face cleaning using the Flange Cleaning Tool (FCT), installation of the Spoolpiece Installation Guide Tool (SIGT) 68 (FIG. 10), and removal of a Pig Launcher (if fitted) from the end of conduit C+.

Figure 19:
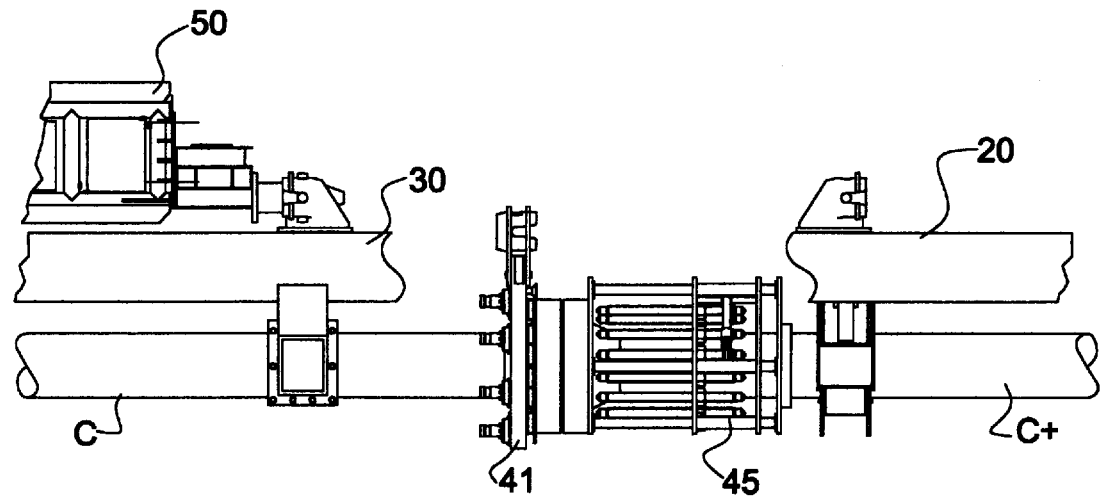
Figure 19A:
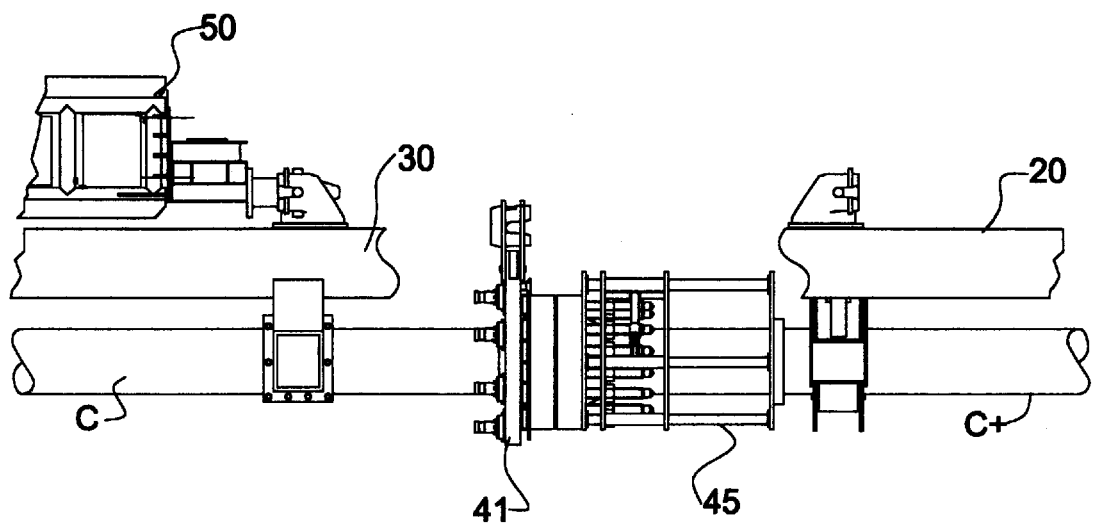
Figure 19B:
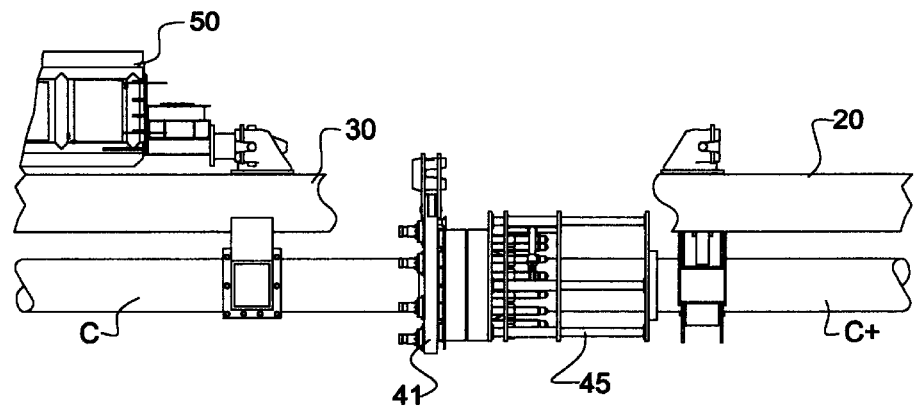
Figure 19C:
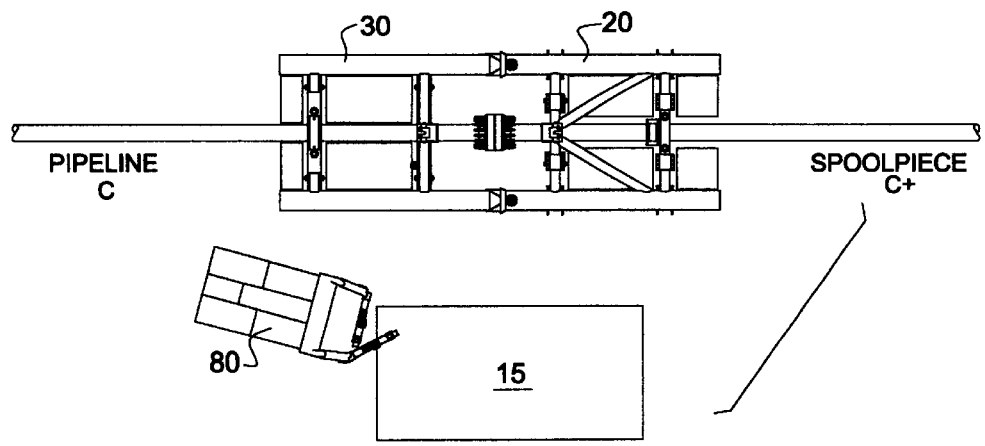
Figure 20:
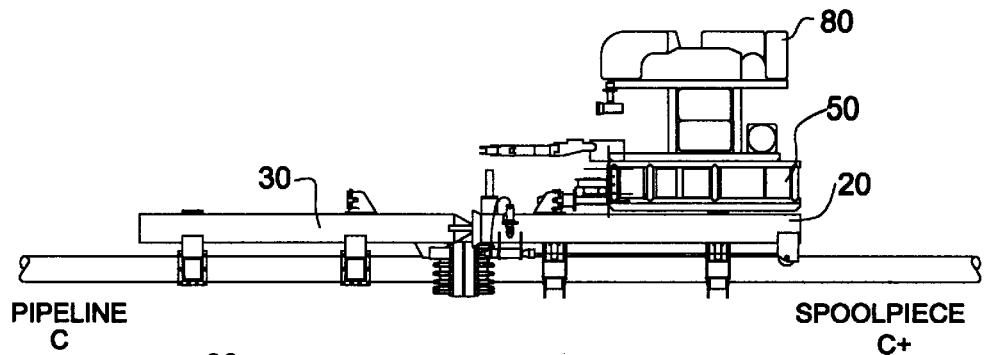
Figure 20A:
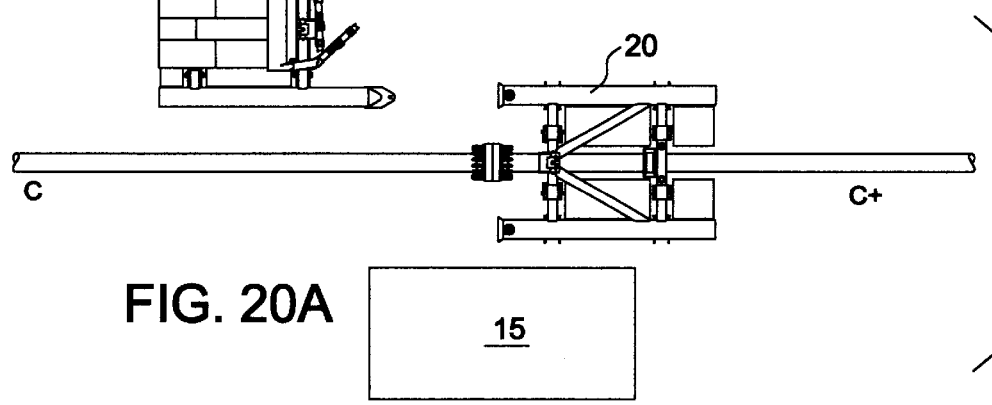
Figure 20B:
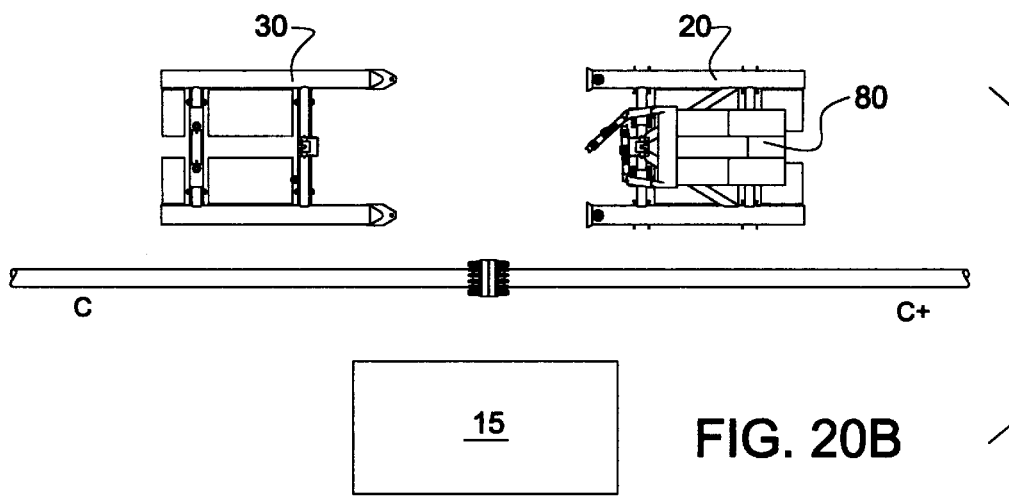
Figure 20C:
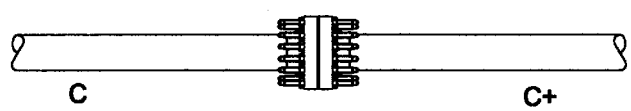
Figure 21:
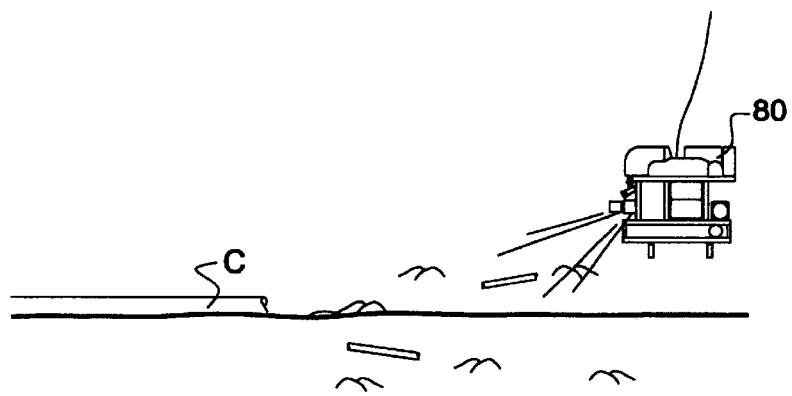
Figure 21A:
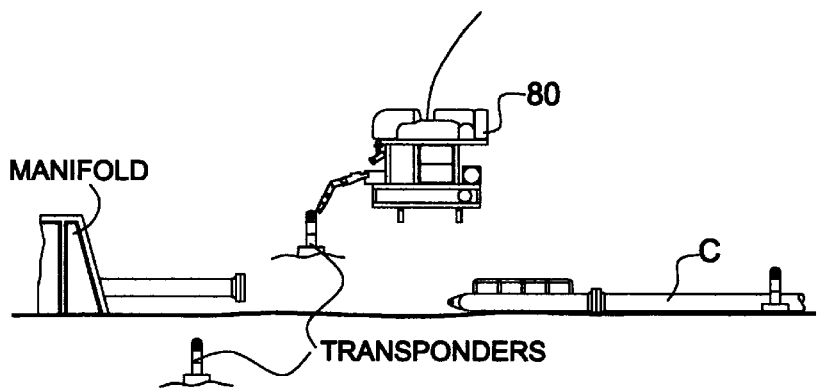
Figure 21B:
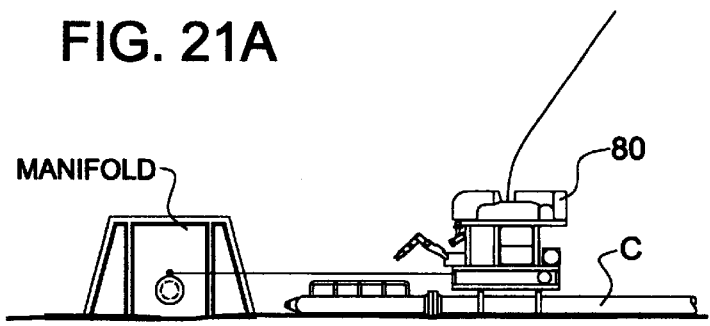
Figure 21C:
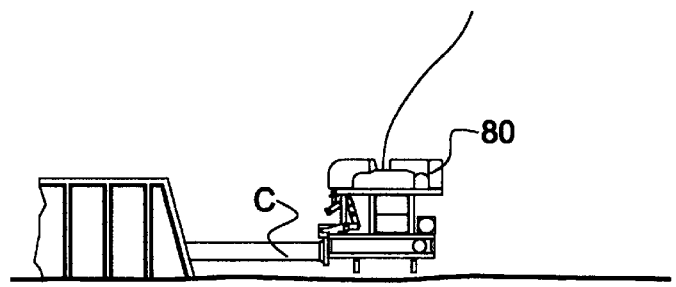
Figure 22:
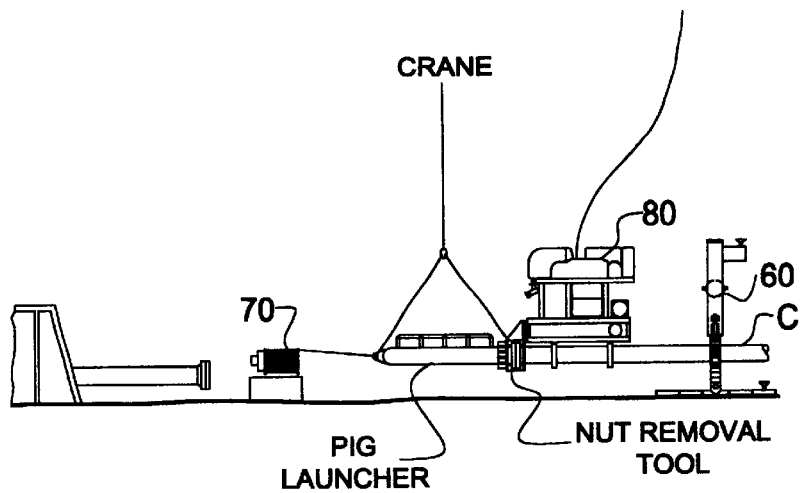
Figure 22A:
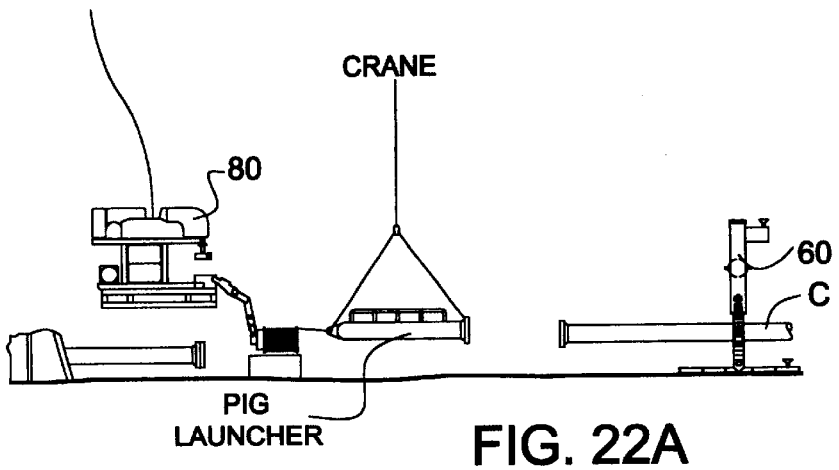
Figure 22B:
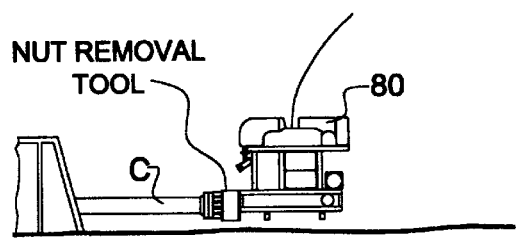
Figure 22C:
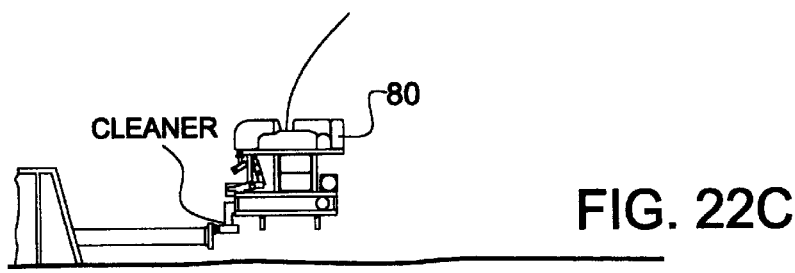

The said rigid spoolpiece C+ is laid on the seabed within a specified target area within the pull-in capabilities of the connection apparatus, as shown in FIG. 19. If the said SIGT 68 (FIG. 10) is employed, then the ROy will be used to guide the spoolpiece so that the female receptacle of the SIGT on the spoolpiece C+ locates with the guidepost on the rigid conduit C.

The ROV is recovered to the surface support vessel to fit the Interface Skid 50 (FIG. 7) to the underside of the ROV structure and connect it's hydraulic and electrical system with that of the SKID 50 (FIG. 7). Once complete the ROV is once again launched to the seabed.

The Reaction Tool (RT) 30 (FIG. 5) or the Reaction Tool Yoke (RTY) 31 (FIG. 5a) (dependant on field layout), the Axial Force Tool (AFT) 20 (FIG. 4) and the Flange Connection Tooling (ECT) (FIG. 6 and 6a) (dependant on flange connector type) are deployed to the seabed from the surface support vessel. All units are contained within their respective deployment structures.

The RT 30 (FIG. 5) or RTY 31 (FIG. 5a) are passive structures designed to interface with the AFT and transmit the spool alignment forces from the AFT into the conduit To enable the RT or RTY to provide this reaction path, it is deployed by the ROV onto rigid conduit C, and is clamped using a friction clamp 33 (FIG. 5) onto the conduit.

This is achieved as the ROV moves to the RT 30 (FIG. 5) and docks on to it's mechanical interface, and makes up it's hydraulic hot stab connector to provide the friction clamp 33 (FIG. 5) with hydraulic power. The RT clamps are opened to remove it from it's deployment frame, from where it is flown by the ROV into position on the rigid conduit C. Once the RT has been deployed in the correct location, it is clamped onto the conduit, no further operations are carried out form the RT. The RT is left installed on the conduit with an accumulator and check valve system to maintain a constant clamping pressure as farther operations are performed.

The following procedural steps are shown in FIGS. 17, 18, 19, 20 and 21, and the connection apparatus operation is shown in more detail in FIGS. 22 to 25

After installation of the RT, the ROV moves to the AFT 20 (FIG. 18) and docks on to the mechanical interface, and makes up the electro-hydraulic connector 54 (FIG. 7) to provide the clamp module 22 (FIG. 4) with hydraulic power. The AFT clamps are opened to remove it from it's deployment frame, from where it is flown by the ROV into position on the rigid spoolpiece C+ Once the AFT 'has been deployed in the correct location, it is clamped onto the pipeline using two hydraulically operated pipe clamps, front and rear. The AFT is left installed on the conduit with an accumulator and check valve system to maintain a constant clamping pressure as further operations are performed.

The ROV then disengages from the AFT and using it's articulated arm removes the SIGT 68 (FIG. 10) from the flanges of both the rigid spoolpiece C+ and the rigid conduit C. and helps recover them to the surface support vessel.

Again using it's articulated arm, the ROV removes the flange pull-in wire anchors 23 (FIG. 4) from the AFT and secures them into the corresponding RT anchor receptacles 34 (FIG. 5).

The ROV once more docks into the mechanical interface of the AFT and makes up the electro-hydraulic connector to provide the pull-in system with hydraulic power. Pull-in of the rigid spoolpiece C+ towards the rigid conduit C is achieved by the hydraulic operation of the pull-in system installed on the AFT. Port side and starboard side pull-in wires can be individually controlled.

As the AFT is pulled towards the RT, the clamping modules 22 (FIG. 4) of the AFT are free to float within the AFT structure. This allows the AFT and RT frames to attain alignment given that both the RT and AFT are clamped onto the rigid pipeline C and the rigid spool-piece C+ respectively, As the AFT and RT are drawn towards each other, guides 35 (FIG. 5) at the front of the structures engage and ensure that the AFT and RT structure align with each other.

When the AFT and RT structures are fully docked, hydraulic locking pins 24 (FIG. 4) located on the AFT are engaged, so connecting the AFT and RT as one structure.

During pull-in the misalignment between the pipeline flange and spool-piece flange will remain, the clamping modules within the AFT will float in the horizontal and vertical planes to compensate for the misalignment.

Once locking of the AFT and RT structure has taken place and the AFT clamping carriages have been misplaced due to the flange misalignment, final alignment of the spool-piece will take place.

Figure 23:
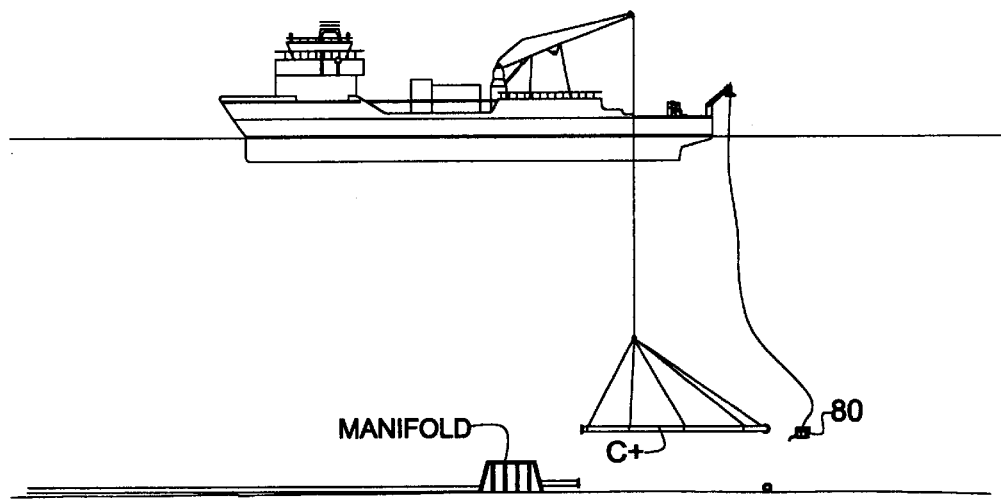
Figure 23A:
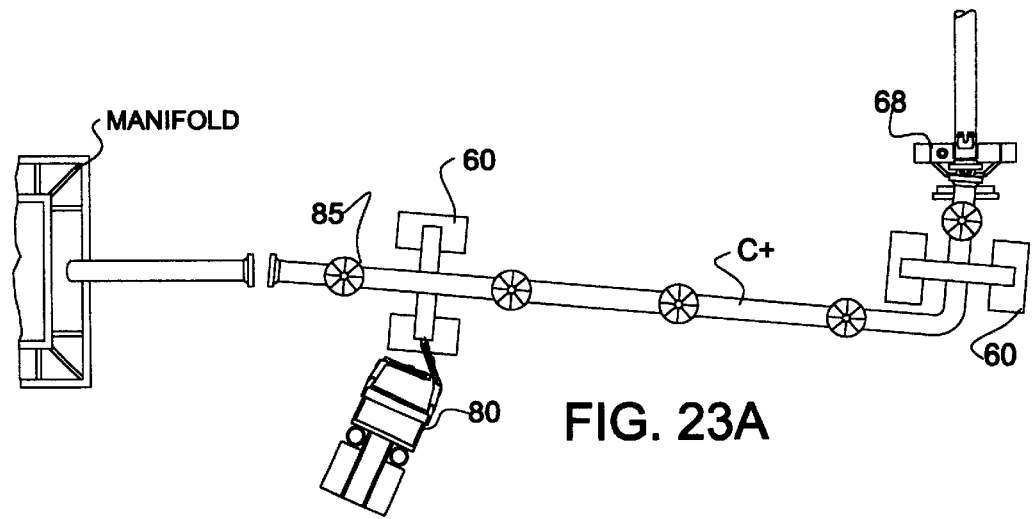
Figure 23B:
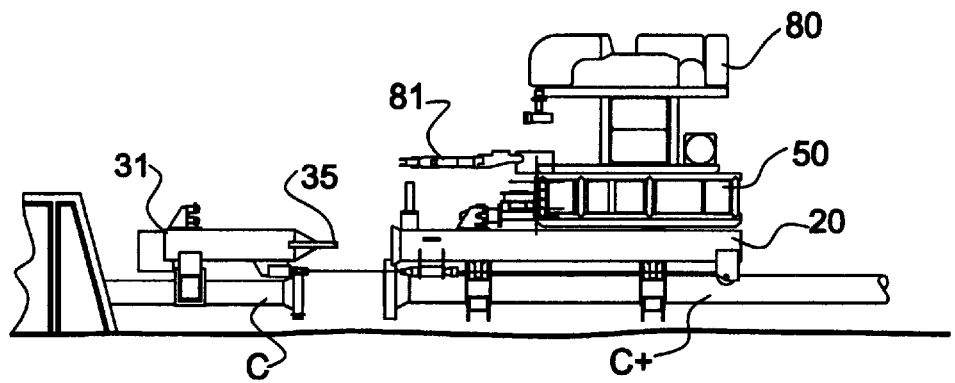
Figure 23C:
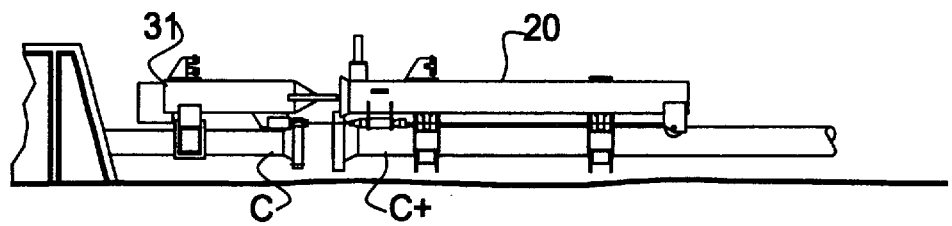

This is achieved by operation of the AFT clamping module horizontal and vertical deflection cylinders. Operation of these cylinders allows the spool-piece to be deflected back onto the centreline of the AFT structure and hence in alignment with the RT structure and consequently the mating flange The rigid conduit flanges are now ready for connection, as shown in FIG. 23, the connector being a clamp connector, a collet connector, a bolted flange or any other type of suitable connection device.

Figure 24:
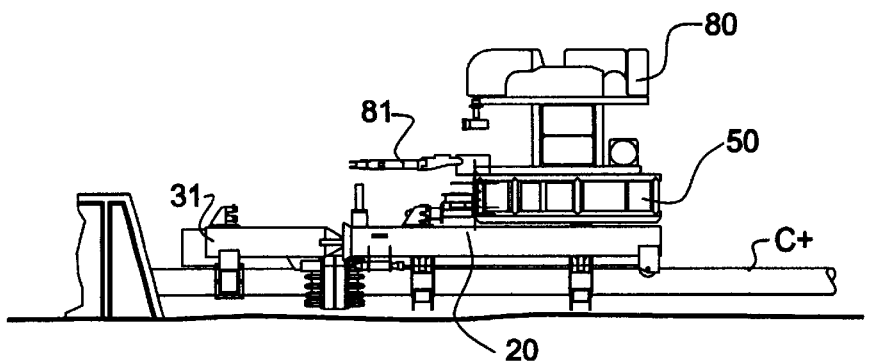
Figure 24A:
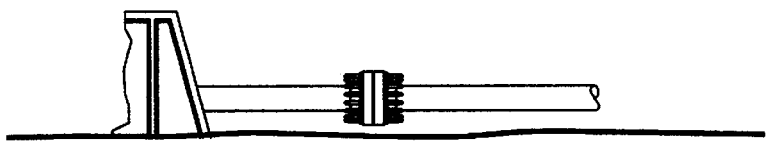
Figure 24B:
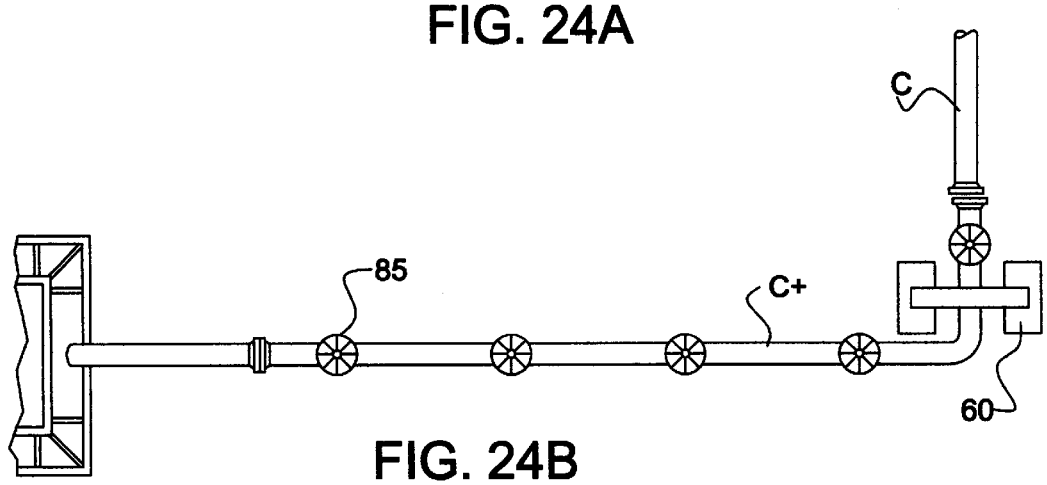
Figure 24C:
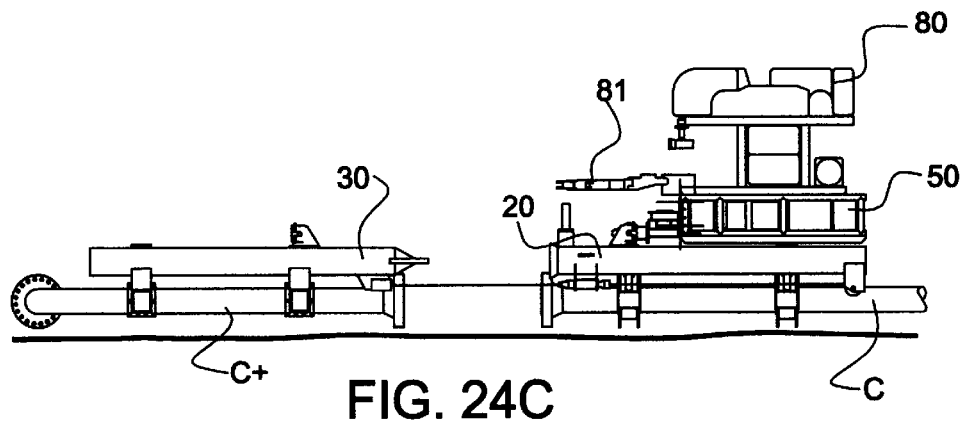

The following describes a method for the connection of standard bolted flanges, and is shown in detail in FIG. 24, where the flange on rigid conduit C is a fixed type, and the flange on rigid spoolpiece C+ is of a swivel type, using the previously described FCT 40 (FIG. 6).

The ROV disconnects from the AFT and docks into the mechanical interface of the BITT 45 (FIG. 6*a*) and makes up it's electro-hydraulic connector to provide the BITT with power. The BITT clamps are opened to remove it from its deployment frame, from where it is flown by the ROV into position on the rigid spoolpiece C+. Once the BITT has been deployed in the correct location (in between the AFT structure and the spoolpiece C+ flange), it is clamped to the spoolpiece with the bolts facing the swivel flange.

Connection of the flange is now ready to proceed as follows:

By providing hydraulic power to the BITT the bolts are to be extended through the spoolpiece C+ flange bolt holes until protruding from the flange face.

ROV to disconnect from the BITT and retrieve the Nut Magazine (NM) 41(FIG. 6) from the deployment frame and clamp it in position around the rigid conduit C (in between the RT structure and the pipe flange)

ROV to retrieve and deploy the seal carrier c/w seal and locate in the spoolpiece C+ flange face using the bolts as a guide.

ROV to connect with the BITT once more to rotationally align the bolts c/w the spoolpiece swivel flange with the pipe fixed flange holes, by hydraulically rotating the BITT structure 47 (FIG. 6*a*)

Alignment pins are to be hydraulically extended from the BITT and locate with receptacles in the NM to bring the NM and it's contained nuts into alignment with the flange holes The bolts are then extended further through the aligned fixed flange and locate with the nuts contained within the NM.

The NM hydraulic motors are operated by a hydraulic hot stab 43 (FIG. 6) from the ROV articulated arm, to engage and run the nuts down the bolts until the nuts are in contact with the rear of the flange face (i e. all nuts are lightly tightened).

The BITT then operates the tensioner jacks 46 (FIG. 6*a*) to tension the bolts and run down the slackened nuts by operating the BITT motors until the motors stall At this point the flanges will closed together and retain the seal.

The tensioning operation is to be performed three times to each bolt,

Once the flange connection has been completed the BITT disengages the reaction nuts and retracts the tensioner magazine leaving the installed bolts in place.

The BITT is the recovered from the spoolpiece C+ by the ROV and deployed back into it's deployment/recovery frame The NM is similarly removed from the rigid conduit C and deployed back into said frame.

As described in the previous embodiment, an air hot stab is taken from the seal test system (located on the ROV) and is inserted into a receptacle on the mated flange assembly. The said air hot stab is pressurised and the pressure monitored. This provides an external seal test verify the integrity of the seal between the two conduits, Once a successful seal test has been completed, the AFT deflection cylinders are retracted and the clamping modules are once again free to float. The pull-in system anchors are disengaged, and the AFT and RT structure are unlocked from each other, The pipe clamps can now be released on the AFT and the AFT can be recovered from the rigid spool-piece C+ and placed back into it's deployment/recovery frame.

Similarly the pipe clamps can now be released on the RT and the RT can be recovered from the rigid conduit C and placed back into it's deployment/recovery frame.

The sequence of events from start to finish is repeated to perform the connection at the 2nd end of the spoolpiece, i.e connecting rigid spoolpiece C+ to rigid conduit C'. To perform the 2nd end connection the ROV will require to re-position the LHF's. The surface support vessel will recover the FCT and re-load it with a full quota of nuts and bolts, then deploy it once more to the new location on the seabed Once a successful seal test has been completed at the 2nd end, then this completes the connection of the conduits to form a continuous flowline.

All items are then recovered to the surface, and the ROV performs a final site survey.

Each step of the above described methods, including all possible combinations of them, can be performed without any need for immersed personnel.

The use of other types of connection system (clamp, collett or flange) is possible by using the relevant connection tool (torque tool for the clamp screw drives, hydraulic hot stab for the collet, and bolt tensioners or torque tools for the flange) forms of which are available on the market. The procedure to perform a seal test and to replace a seal will also be similar to that outlined above, but using different types of tools which are also readily available on the market.

I claim:

1. A method of mutually connecting underwater conduits from a support vessel on the surface comprising the steps of providing a first and a second underwater conduit, launching a remotely operated vehicle from the support vessel; launching connection apparatus having a docking clamp from the support vessel; manipulating the remotely operated vehicle to dock with the connection apparatus; installing the connection apparatus to said first conduit; activating said docking clamp using the remotely operated vehicle to capture the end of the second conduit; activating the connection apparatus to draw the second conduit toward the first; connecting the two conduits together to form a sealed continuous flowline; and recovering the remotely operated vehicle and connection apparatus to the support vessel.

2. A method according to claim 1 and further including the step of supporting one of said conduits on a frame above the sea bed.

3. A method according to claim 1 or 2, wherein the remotely operated vehicle carries out a survey of the work site and sends a report to the support vessel prior to connection of the conduits.

4. A method according to claim 2 wherein the frame is clamped to the conduit.

5. A method according to claim 4 wherein the remotely operated vehicle docks with the frame and operates the clamp to secure the conduit thereto.

6. A method according to claim 1, wherein buoyancy modules are installed on the second conduit.

7. A method according to claim 6, wherein the buoyancy modules are inflated from a single air source, located on the sea bed and operated by the remotely operated vehicle.

8. A method according to claim 7, wherein the remotely operated vehicle is operated to adjust the position of the buoyancy modules along the length of the second conduit to adjust the vertical alignment of said conduit prior to connection to the first conduit.

9. A method according to claim 1, wherein the remotely operated vehicle is operated to remove a cap from the free end of the conduit.

10. A method according to claim 1, wherein the connection of the two conduits is monitored by a camera mounted on the remotely operated vehicle.

11. A method according to claim 1, wherein a seal test is performed to verify the integrity of the seal between the two conduits.

12. An apparatus for mutually connecting underwater conduits being controlled from a support vessel on the surface, the apparatus comprising a remotely controlled vehicle launchable and recoverable from the support vessel; connection apparatus for launching and being recoverable from the support vessel; means for docking the remotely operated vehicle to the connection apparatus; means for mounting the connection apparatus on at least one of said underwater conduits constituting a first conduit; means provided on the remotely controlled vehicle for capturing the end of the other of said underwater conduits constituting a second conduit and drawing the second conduit to the first to enable a connection of the conduits together to form a continuous flowline; means to effect the connection; and means for providing a sealed joint at said connection.

13. An apparatus according to claim 12 and further comprising an interface skid, launchable and recoverable from the support vessel to which the remotely operated vehicle docks in order to provide docking terminals for the connection apparatus on the remotely controlled vehicle.

14. An apparatus according to claim 12 or 13, comprising a support frame launched from the support vessel, the support frame being placed around one of the conduits by the remotely operated vehicle to raise the conduit from the sea bed.

15. An apparatus according to claim 14 wherein the connection apparatus is launched in a sledge from the support vessel.

16. An apparatus according to claim 15 wherein an interface collar is provided on the free end of the conduits to allow the connectin apparatus to be mounted in position on the conduits.

17. An apparatus according to claim 14 wherein the support frame is a lightweight metallic frame substantially h-shaped in configuration.

18. An apparatus according to claim 14 wherein the support frame and the connection apparatus are substantially neutrally buoyant in water.

19. An apparatus according to claim 12 comprising,
an interface skid, launchable and recoverable from the support vessel to which the remotely operated vehicle docks in order to provide docking terminals for the connection apparatus on the remotely controlled vehicle, and comprising
a support frame launched from the support vessel, the support frame being placed around one of the conduits by the remotely operated vehicle to raise the conduit from the sea bed, and wherein
the connectin apparatus is launched in a sledge from the support vessel, and wherein
an interface collar is provided on the free end of the conduits to allow the connection apparatus to be mounted in position on the conduits, and wherein
the support frame is a lightweight metallic frame substantially h-shaped in configuration, and wherein
the support frame and the connection apparatus are substantially neutrally buoyant in water.

* * * * *

UNITED STATES PATENT AND TRADEMARK OFFICE
CERTIFICATE OF CORRECTION

PATENT NO.      : 6,234,717 B1
APPLICATION NO. : 09/376070
DATED           : May 22, 2001
INVENTOR(S)     : Corbetta It is certified that error appears in the above-identified patent and that said Letters Patent is hereby corrected as shown below:

On the front page of the patent, the "Related U.S. Application Data" should appear as follows:
(63) Continuation of application No. 09/054,943, filed April 3, 1998, now U.S. Patent 6,767,165.

On the front page of the patent, the Foreign Application Priority Data should appear as follows:
(30)    Foreign Application Data April 3, 1997 (GB) .....................................9706762.3

Signed and Sealed this

Twentieth Day of February, 2007

JON W. DUDAS
*Director of the United States Patent and Trademark Office*